United States Patent
Amimori et al.

(10) Patent No.: US 8,709,553 B2
(45) Date of Patent: Apr. 29, 2014

(54) PATTERNED BIREFRINGENT PRODUCT

(75) Inventors: Ichirou Amimori, Minami-ashigara (JP); Osamu Sawanobori, Minami-ashigara (JP); Kouki Takahashi, Minami-ashigara (JP); Satomi Suzuki, Minami-ashigara (JP); Masao Nakajima, Minami-ashigara (JP); Hideki Kaneiwa, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 183 days.

(21) Appl. No.: 13/072,304

(22) Filed: Mar. 25, 2011

(65) Prior Publication Data
US 2011/0234969 A1  Sep. 29, 2011

(30) Foreign Application Priority Data

Mar. 26, 2010  (JP) .................................. 2010-072686

(51) Int. Cl.
*B44F 1/00* (2006.01)
*G02F 1/13363* (2006.01)

(52) U.S. Cl.
USPC ............... 428/1.3; 349/117; 283/72; 283/85; 283/90

(58) Field of Classification Search
USPC .................. 428/1.3–133; 349/114, 117–121; 359/584–589; 283/72, 85, 90
See application file for complete search history.

(56) References Cited

U.S. PATENT DOCUMENTS

| | | | |
|---|---|---|---|
| 6,535,337 B1 * | 3/2003 | Tanaka et al. ................ | 359/599 |
| 7,820,252 B2 * | 10/2010 | Higashi et al. ............... | 428/1.3 |
| 8,111,352 B2 * | 2/2012 | Stalder et al. ................. | 349/64 |
| 8,168,080 B2 | 5/2012 | Hoshino et al. | |
| 8,514,354 B2 * | 8/2013 | Amimori et al. ............. | 349/117 |
| 2003/0104155 A1 * | 6/2003 | Morii et al. .................. | 428/40.1 |
| 2003/0134105 A1 * | 7/2003 | Toshine et al. ............... | 428/323 |
| 2008/0143926 A1 * | 6/2008 | Amimori et al. ............. | 349/75 |
| 2009/0242834 A1 | 10/2009 | Hoshino et al. | |
| 2009/0310195 A1 * | 12/2009 | Suzuki et al. ................. | 359/2 |

FOREIGN PATENT DOCUMENTS

| | | | |
|---|---|---|---|
| JP | 2004-240087 A | | 8/2004 |
| JP | 2008-139508 A | | 6/2008 |
| JP | 2009-69793 A | | 4/2009 |
| JP | 2009-265964 A | | 11/2009 |
| JP | 2011203637 A | * | 10/2011 |
| WO | WO 2008/018560 A1 | | 2/2008 |

OTHER PUBLICATIONS

Japanese Office Action (including partial English language translation), mailed Jun. 18, 2013, for corresponding Japanese Patent Application No. 2010-072686.

* cited by examiner

*Primary Examiner* — Sophie Hon
(74) *Attorney, Agent, or Firm* — Birch, Stewart, Kolasch & Birch, LLP

(57) ABSTRACT

A product comprising a patterned optically anisotropic layer having two or more regions of different birefringence in the form of a pattern, which further comprises a semi-transmissive-half-reflective layer having a transmittance of 30% or higher and a reflectance of 30% or higher is provided. The product permits visualization of a latent image in the product through a polarizing plate as well as visualization of the information on the side opposite to the side to be viewed from.

18 Claims, 7 Drawing Sheets

(a)

(b)

(c)        (d)

unit:mJ/cm²

(a)       (b)      unit:mJ/cm²

PATTERNED BIREFRINGENT PRODUCT

CROSS-REFERENCE TO RELATED APPLICATIONS

This application claims benefit of priority under 35 USC 119 to Japanese Patent Application No. 2010-072686 filed on Mar. 26, 2010, which is expressly incorporated by reference herein in its entirety.

TECHNICAL FIELD

The present invention relates to a patterned birefringent product. More particularly, the present invention relates to a semi-transmissive-half-reflective patterned birefringent product.

RELATED ART

The counterfeiting of luxury brands, cash vouchers, gift certificates, credit cards, industrial parts, and the like has continued to rise in recent years. The application of image formation employing birefringence patterns to security products designed to prevent counterfeiting has been proposed as a countermeasure to these counterfeit products (for example, see Japanese Unexamined Patent Publication (KOKAI) No. 2009-69793, the disclosure of which is expressly incorporated by reference herein in its entirety). A birefringence pattern is a latent image that is invisible under an unpolarized light source, making it possible to render information such as an image visible with a polarizing filter. The method described in Japanese Unexamined Patent Publication (KOKAI) No. 2009-69793 permits ready control of the level of in-plane retardation, thus permitting the formation of a full-color image of high transmittance or reflectance without employing a color filter and rendering counterfeiting highly difficult.

However, among the conventional security products that use image formation employing birefringence patterns, there have been no products that are provided on a printed surface of paper and have the information of the printed surface visible while also having the latent image visible through a polarizing plate.

SUMMARY OF THE INVENTION

The present invention has for its object to provide a patterned birefringent product that permits visualization of a latent image in the product through a polarizing plate as well as visualization of the information on the side opposite to the side to be viewed from.

The present inventors conducted extensive research into achieving the above object, resulting in the discovery that the above object can be solved by an introduction of a semi-transmissive-half-reflective layer. The present inventors further have solved the problems caused by the use of the above layer, and have achieved the present invention.

The present invention thus provides [1] to [10] below:

[1] A product comprising a patterned optically anisotropic layer having two or more regions of different birefringence in the form of a pattern, which further comprises a semi-transmissive-half-reflective layer having a transmittance of 30% or higher and a reflectance of 30% or higher.

[2] The product according to [1] wherein the regions of different birefringence are regions of different retardation or of different slow axis

[3] The product according to [2] wherein the patterned optically anisotropic layer has a region of retardation 30 to 1000 nm and a region of retardation less than 30 nm.

[4] The product according to any one of [1] to [3], wherein the patterned optically anisotropic layer is a layer that is formed of a composition comprising a liquid-crystal compound having at least one reactive group.

[5] The product according to [4], wherein the patterned optically anisotropic layer is formed by a method comprising steps below:
irradiating with heat or light a layer formed of a composition comprising a liquid-crystal compound;
subjecting the layer to patterned light exposure; and
heating the layer obtained to 50° C. or higher but not higher than 400° C.

[6] The product according to [5], wherein the patterned light exposure is scanning exposure.

[7] The product according to any one of [4] to [6], wherein the liquid-crystal compound has at least one reactive group for radical polymerization and at least one reactive group for cationic polymerization.

[8] The product according to [7], wherein the reactive group for radical polymerization is acrylic group or methacrylic group, and the reactive group for cationic polymerization is vinyl ether group, oxetanyl group, or epoxy group.

[9] The product according to any one of [1] to [8], comprising a protective layer with a refractive index of 1.4 to 1.7, and
comprising the semi-transmissive-half-reflective, the patterned optically anisotropic layer, and the protective layer in this order.

[10] The product according to any one of [1] to [9], which is embrittled.

EFFECT OF THE INVENTION

The present invention provides a patterned birefringent product that permits visualization of a latent image through a polarizing plate as well as visualization of the information under the product.

MODES OF CARRYING OUT THE INVENTION

Figure 1:
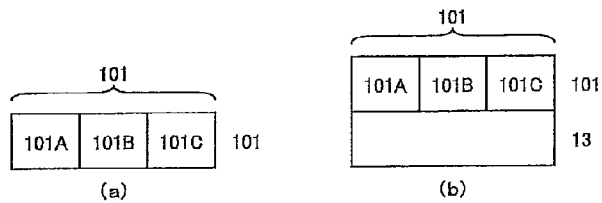
FIG. 1: Diagrams showing typical structures of basic patterned birefringent products.

The present invention is described in detail below.

In the present description, a "to" is employed to mean that the upper limit value and lower limit value of the numeric values indicated before and after it are included.

In the present description, the terms "phase differential," "retardation," and "Re" denote in-plane retardation. The in-plane retardation (Re θ) can be measured by the spectral phase differential method by conversion from a transmission or reflectance spectrum to a phase differential by the method described in the Journal of the Optical Society of America, Vol. 39, p. 791-794 (1949) or Japanese Unexamined Patent Publication (KOKAI) No. 2008-256590, the disclosures of which are expressly incorporated by reference herein in their entireties. The above references are measurement methods that employ transmission spectra. Since the light passes through the optically anisotropic layer twice, particularly in the case of reflection, half of the phase differential converted from the reflection spectrum can be employed as the phase differential of the optically anisotropic layer. Re0 is the frontal retardation. Re(λ) is the retardation employing light of wavelength λ nm as the measurement beam. The retardation or Re in the present description means the retardation measured at the wavelengths of 611±5 nm, 545±5 nm, and 435±5 nm for R, G, and B, and means the retardation measured at a wavelength of 545±5 nm or 590±5 nm when no reference to color is given.

In the present description, use of the word "essentially" in reference to an angle means that the difference from the precise angle falls within a range of less than ±5°. The difference from the precise angle is preferably less than 4°, and is more preferably less than 3°. In reference to retardation, the word "essentially" means a difference in retardation of within ±5°, inclusive. A "retardation of essentially 0" means a retardation of 5 nm or less. Unless specifically stated otherwise, the wavelength at which a refractive index is measured refers to any wavelength within the visible light region. In the present description, the term "visible light" refers to light with a wavelength of from 400 to 700 nm.

In the present description, transmittance means a value denoted by "$(I_2/I_0) \times 100\%$" and a reflectance means a value denoted by "$(I_1/I_0) \times 100\%$" when the intensity of the reflected light is set as $I_1$ and the intensity of the transmitted light is set as $I_2$ upon a irradiation of light of intensity $I_0$ from the side the product is viewed from.

[The Definition of a Birefringence Pattern]

Broadly defined, a birefringence pattern is the two-dimensional in-plane or three-dimensional patterning of two or more domains of differing birefringence. In particular, two-dimensionally within a plane, the birefringence is defined by the two parameters of the direction of the slow axis in which the refractive index peaks in-plane and the magnitude of retardation within the domain. For example, in-plane oriented defects and the inclination distribution of liquid crystals in the direction of thickness in a phase differential film based on a compound with liquid crystallinity can also be said to constitute a birefringence pattern in a broad sense. However, in a narrow sense, patterning that is achieved by intentionally controlling birefringence based on a predetermined design is desirably defined as a birefringence pattern. In the present invention, a birefringence pattern can be a pattern that is formed of domains of differing magnitudes of retardation in which the direction of the slow axis is constant, a pattern that is formed of domains in which the directions of the slow axes differ, or a pattern that is formed of domains of both differing slow axis directions and retardation magnitudes. Unless specifically stated otherwise, the birefringence pattern can be comprised of multiple layers, and the boundaries between the patterns of the multiple layers can align or be different.

[The Patterned Birefringent Product]

In the present description, the phrase "patterned birefringent product" means a product having two or more regions of differing birefringence. The patterned birefringent product preferably comprises three or more regions of differing birefringence. Individual regions of identical birefringence can be continuous or discontinuous in shape.

FIGS. 1 to 8 are examples of patterned birefringent products. The patterned birefringent products comprise at least one patterned optically anisotropic layer 101. In the present description, the phrase "patterned optically anisotropic layer" means an optically anisotropic layer in which regions of differing birefringence are present in the form of a pattern. The patterned optically anisotropic layer can be readily fabricated using the birefringence pattern builder described further below, for example, but the method of fabrication is not specifically limited other than that it yield a layer comprised of regions of different birefringence present in the form of a pattern.

In the figures, regions of differing birefringence are illustrated as 101A, 101B, and 101C.

The patterned birefringent products shown in FIGS. 1(a) and (b) show the structures of the most basic patterned birefringent products.

By using the patterned birefringent product shown in FIG. 1(a) with self-supporting capability, a patterned optically anisotropic layer 101 can be transferred to a product having a semi-transmissive-half-reflective layer with an adhesive or contact adhesive.

In the structure of FIG. 1(b), both the light source and the measurement point can be positioned on one side as viewed from the patterned optically anisotropic layer, and a semi-transmissive-half-reflective layer 13 is present on the surface on the opposite side as viewed from the patterned optically anisotropic layer of the patterned birefringent product. Light exiting a polarizing light source fabricated with a polarizing filter or the like passes through the patterned birefringent product, reflects off the semi-transmissive-half-reflective layer, and passes back through the patterned birefringent product. Light of differing elliptical polarization within the plane is caused to exit, and passes through the polarizing filter again on the measurement point side, rendering information visible. Here, the polarizing filter can be a linearly polarizing filter, a circularly polarizing filter, or an elliptically polarizing filter. The polarizing filter itself can have a birefringence pattern or dichroic pattern. A single polarizing filter can be employed as a light source and for measurement. The reflective layer can also serve as a highly reflective holographic layer, electrode layer, or the like.

The semi-transmissive-half-reflective layer partially reflects light and partially passes light. When the light source and the measurement point are on opposite sides of the patterned optically anisotropic layer, the light exiting from a polarizing light source fabricated with a polarizing filter or the like passes through the patterned birefringent product, and light of differing elliptical polarization within the plane is caused to exit, passing through the polarizing filter and rendering information visible on the measurement point side. That is, not only can the patterned birefringent product render visible both transmitted and reflected images, but also general information such as text and images present on the bottom side of the semi-transmissive-half-reflective layer of the patterned birefringent product can be recognized visually from the top side of the optically anisotropic layer without any filters. The semi-transmissive-half-reflective layer can be on the optically anisotropic layer side or the opposite side of the support, but is preferably on the optically anisotropic layer side because this places few limitations on the support.

Figure 2:
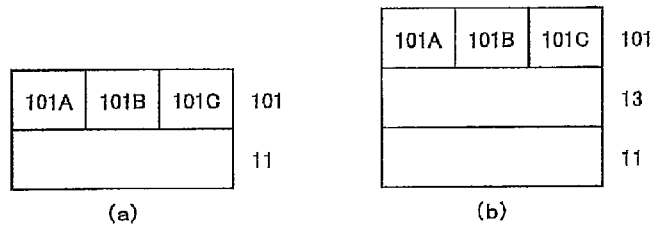
FIG. 2: Diagrams showing typical structures of patterned birefringent products each having a patterned optically anisotropic layer on a support or temporary support.
Figure 3:
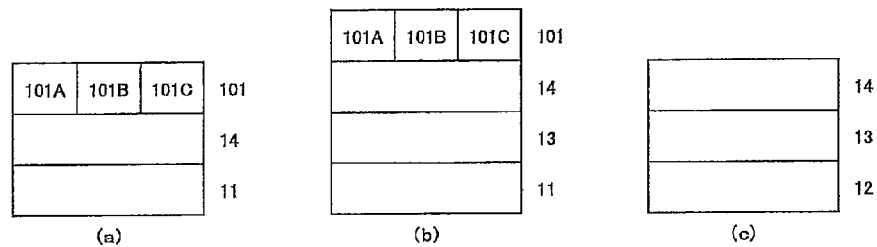
FIG. 3: Diagrams showing typical structures of patterned birefringent products each having an orientation layer.
Figure 4:
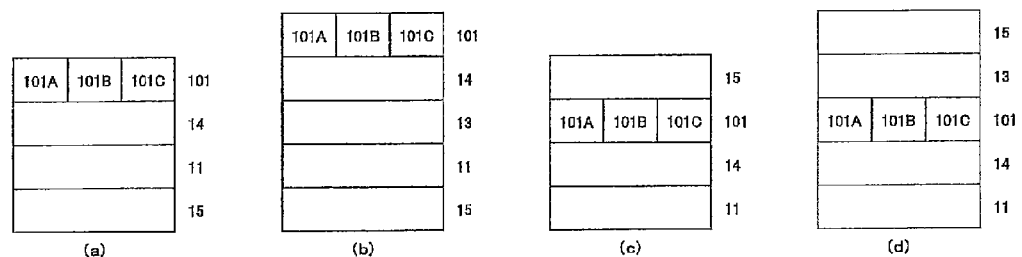
FIG. 4: Diagrams showing typical structures of patterned birefringent products each having an adhesive layer.
Figure 5:
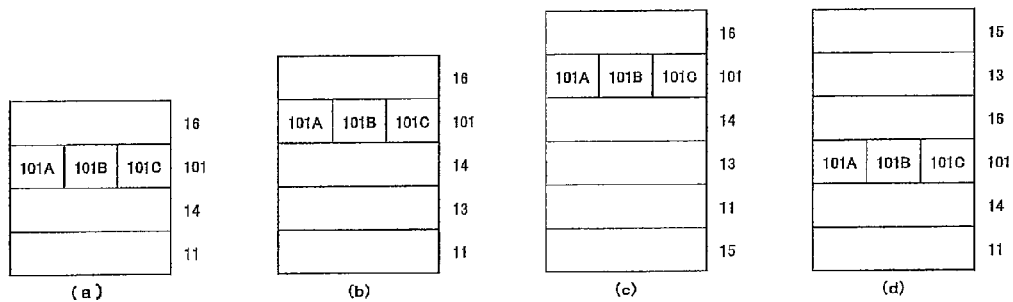
FIG. 5: Diagrams showing typical structures of patterned birefringent products each having a printed layer.
Figure 6:
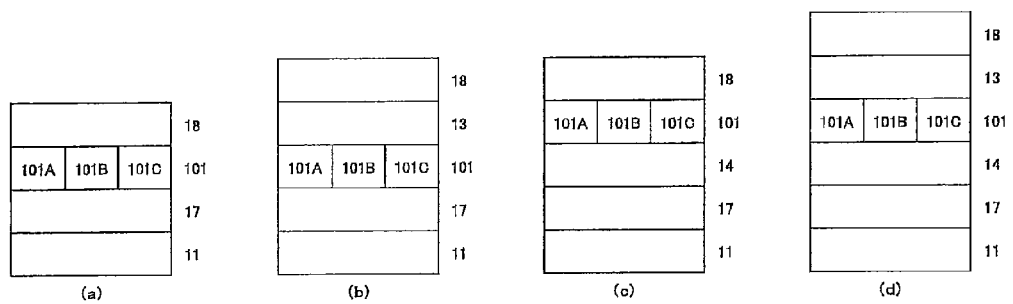
FIG. 6: Diagrams showing typical structures of transfer-type patterned birefringent products each having a dynamic property control layer and a transfer layer.
Figure 7:
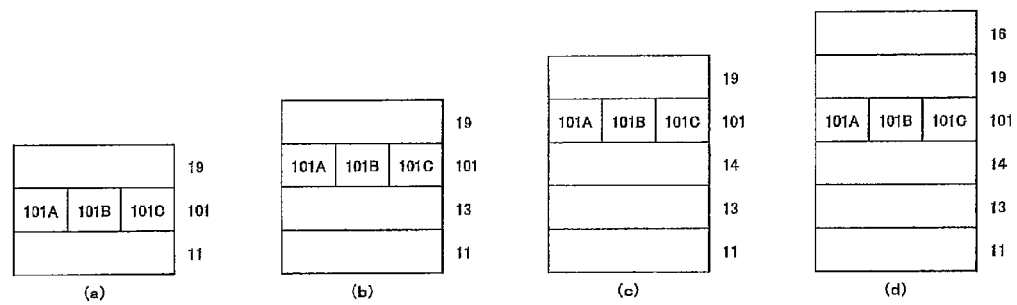
FIG. 7: Diagrams showing typical structures of patterned birefringent products each having an additive layer.
Figure 8:
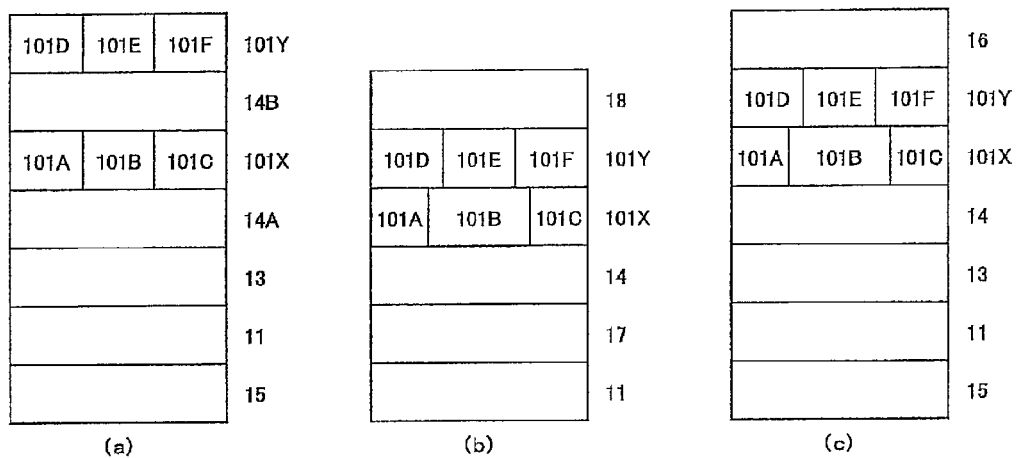
FIG. 8: Diagrams showing typical structures of patterned birefringent products each including multiple patterned optical anisotropic layers.

FIG. 2 (b) is an example having a patterned optically anisotropic layer 101 on a support or temporary support. The structure shown in FIG. 2 (a), in which the support 11 is used as a temporary support, can be employed to transfer patterned optically anisotropic layer 101 to a product having semi-transmissive-half-reflective layer with an adhesive or contact adhesive.

The patterned birefringent products shown in FIGS. 3(a) to (c) are examples each having an orientation layer 14. When employing a layer formed of an optically anisotropic layer that has been fixed by polymerization by heating or irradiation with light after coating and drying a solution containing a liquid-crystal compound to form a liquid-crystal phase as patterned optically anisotropic layer 101, orientation layer 14 functions to facilitate orientation of the liquid-crystal compound.

FIGS. 4(a) to (d) are examples of patterned birefringent products each having an adhesive layer. An adhesive layer becomes necessary when fabricating a patterned birefringent product such as a seal label. Generally, mold-releasing paper or a mold-releasing film is bonded to the adhesive layer. This is preferable from a practical perspective. Further, it can be a special adhesive layer such that any attempt to peel it off once bonded to the targeted material causes adhesive to remain on the target item in a specific pattern.

FIGS. 5(a) to (d) are examples of patterned birefringent products containing printed layers. The printed layer is generally one that produces a visible image, and superposed on an invisible birefringence pattern. It can be combined with invisible security printing by means of a UV fluorescent dye or IR dye. The printed layer can be above or beneath the optically anisotropic layer, or can be on the opposite side of the support from the optically anisotropic layer. If the printed layer transmits light, when rendering a latent image based on a birefringence pattern visible with a filter, the print and latent image become visible in combination.

FIGS. 6(a) to (d) are examples of transfer-type patterned birefringent products each having a dynamic property control layer and a transfer layer. A dynamic property control layer is a layer that controls the separation property so that an optically anisotropic layer is transferred to the targeted material when prescribed conditions are satisfied when the transfer layer is brought into contact with the targeted material. A separation layer imparting a separating property to an adjacent layer and a cushion layer that increases transferability by applying uniform stress during transfer are examples of dynamic property control layers. In addition to common adhesives and contact adhesives, examples of the transfer layer include hot melt contact adhesives that develop adhesiveness when heated, UV contact adhesives that develop adhesiveness when exposed to UV radiation, and layers on which the pattern to be transferred is printed in the form of a contact adhesive. Although not shown in the figure, such a layer can also function as both an orientation layer and a dynamic property control layer. A transfer-type patterned birefringent product having no semi-transmissive-half-reflective layer can be transferred to a targeted material having a semi-transmissive-half-reflective layer to be used.

The patterned birefringent products shown in FIGS. 7(a) to (d) have additive layers. Additive layers include layers for subsequently adding a plasticizer or a photopolymerization initiator to an optically anisotropic layer as set forth further below, hardcoat layers for surface protection, water-repellent layers to keep fingerprints from sticking and to prevent doodling with magic markers, electrically conductive layers imparting touch panel properties, blocking layers that make the product invisible to an IR camera by not transmitting IR radiation, circularly polarized light-selective reflective layers in which an image is made to disappear by a circularly polarized light filter by not passing left or right circularly polarized light, photosensitive layers imparting photosensitivity to an optically anisotropic layer, antenna layers functioning as RFID antennas, immersion-detecting layers that detect immersion in water by changing color or the like when immersed in water, thermotropic layers that change color based on temperature, coloration-filtering layers that control the colors of latent images, transmitting-type polarized layers in which latent images become visible when a switch is made between polarized light/unpolarized light on the light source side, magnetic layers that impart magnetic recording properties, as well as layers that function as matte layers, scattering layers, lubricating layers, photosensitive layers, antistatic layers, and resist layers.

The patterned birefringent products shown in FIGS. 8(a) to (c) have multiple patterned optically anisotropic layers. The in-plane slow axes of the multiple optically anisotropic layers can be identical or different, but are preferably different. The regions of multiple optically anisotropic layers of differing birefringence can align or be different. Although not shown, there can be three or more patterned optically anisotropic layers. By providing two or more optically anisotropic layers of mutually differing retardation or slow axes and imparting independent patterns to each, latent images with various functions can be formed.

[The Birefringence Pattern Builder]

A method employing a birefringence pattern builder, an example of the method of forming a birefringence pattern, will be described below. A birefringence pattern builder refers to a material for fabricating a birefringence pattern that can be used to fabricate a patterned birefringent product through a series of prescribed steps. Unless specifically stated otherwise, the method of forming a birefringence pattern is not limited to this method.

The birefringence pattern builder can normally be in the form of a film or sheet. The birefringence pattern builder can be comprised of an optically anisotropic layer alone, or can further comprise functional layers imparting various secondary functions. Examples of functional layers include supports, orientation layers, semi-transmissive-half-reflective layers, and adhesives layers. A birefringence pattern builder that is employed as a transfer material, or a birefringence pattern builder that is fabricated using a transfer material can comprise a temporary support or a dynamic property control layer.

Figure 9:
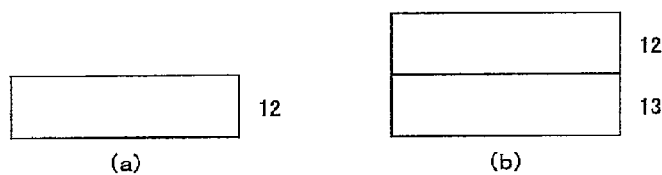
FIG. 9: Diagrams showing typical structures of basic birefringence pattern builders.

The birefringence pattern builder shown in FIG. 9(a) is an example of a birefringence pattern builder comprised of an optically anisotropic layer 12 with self-supporting capability.

The optically anisotropic layer is a birefringent layer, and can be in the form of a layer in which a uniaxially or biaxially-stretched polymer or an oriented liquid-crystal compound has been fixed, an organic or inorganic single-crystal layer of aligned orientation, or the like. The optically anisotropic layer is preferably a layer that has the function of permitting control of the optical anisotropy at will through patterned light exposure such as exposure to light through a photomask or digital exposure; patterned heating such as with a hot stamp, thermal head, or UV radiation laser beam exposure; stylus drawing by mechanically applying pressure or shear with a pin or pen; printing a reactive compound; or the like. This is because an optically anisotropic layer having such a function facilitates the obtaining of a patterned optically anisotropic layer by the method set forth further below. The use of patterned light exposure such as exposure to light through a photomask or scanning optical exposure is preferable for pattern formation. The patterning step can be combined with bleaching, development, or the like by means of heat or chemicals as needed in forming a pattern. In that case, heat bleaching and development are preferable because they place few limitations on the support. The birefringence pattern builder shown in FIG. 9(b) is an example of forming a semi-transmissive-half-reflective layer 13 on an optically anisotropic layer 12 that is capable of self-support.

Figure 10:
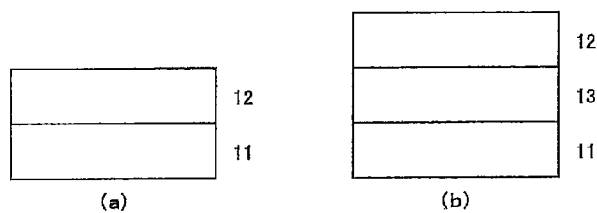
FIG. 10: Diagrams showing typical structures of birefringence pattern builders each having an optically anisotropic layer on a support or temporary support.

FIGS. 10(a) and (b) are examples of an optically anisotropic layer 12 present on a support or temporary support 11. In the case having a temporary support, an adhesive or contact adhesive can be employed to transfer an optically anisotropic layer to the targeted product.

Figure 11:
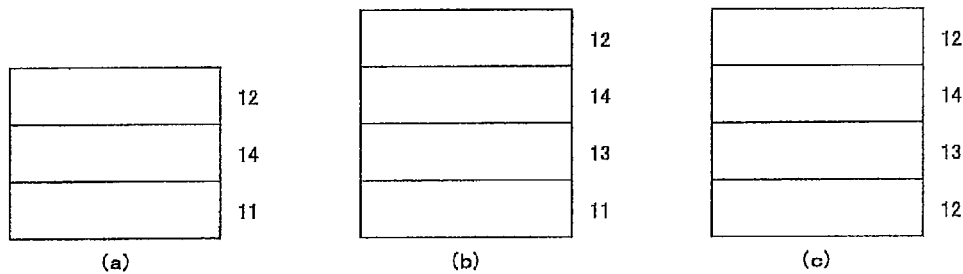
FIG. 11: Diagrams showing typical structures of birefringence pattern builders each having an orientation layer.
Figure 12:
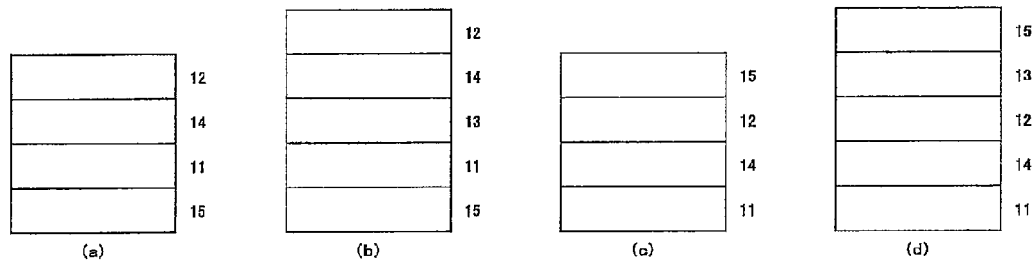
FIG. 12: Diagrams showing typical structures of birefringence pattern builders each having an adhesive layer.
Figure 13:
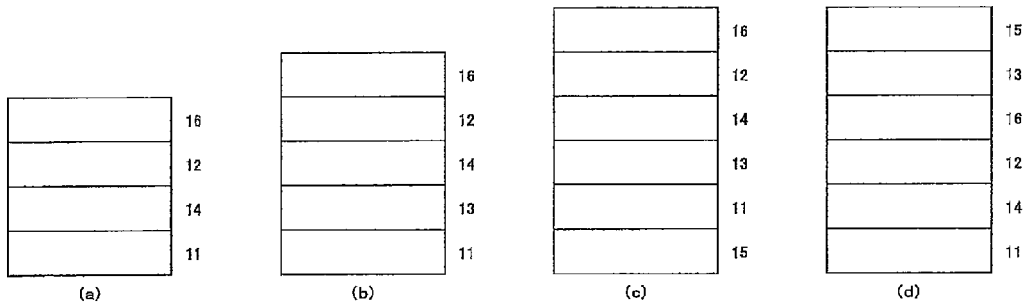
FIG. 13: Diagrams showing typical structures of birefringence pattern builders each having a printed layer.
Figure 14:
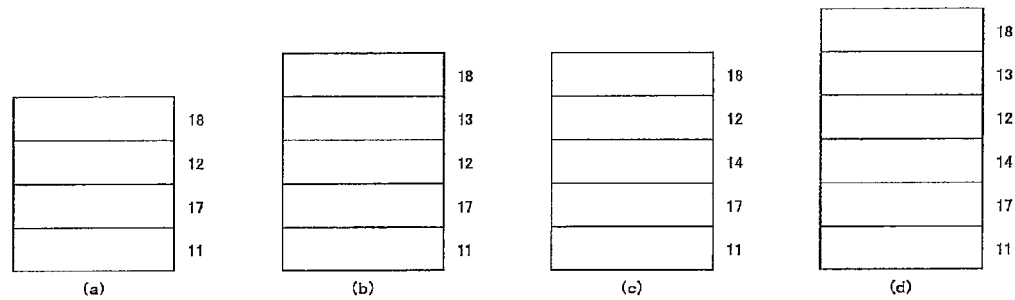
FIG. 14: Diagrams showing typical structures of transfer-type birefringence pattern builders each having a dynamic property control layer and a transfer layer.
Figure 15:
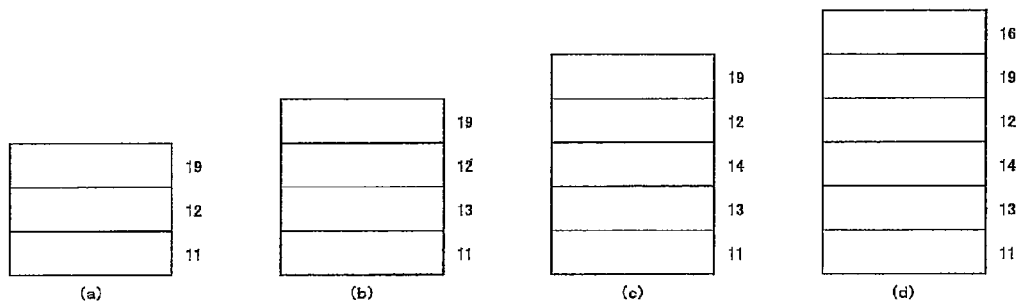
FIG. 15: Diagrams showing typical structures of birefringence pattern builders each having an additive layer.

FIGS. 11(a) to (c) are examples of birefringence pattern builders with an orientation layer 14.

FIGS. 12(a) to (d) are examples of birefringence pattern builders having an adhesive layer.

FIGS. 13(a) to (d) are examples of birefringence pattern builders having a printed layer.

FIGS. 14(a) to (d) are examples of transfer-type birefringence pattern builders having a dynamic property control layer and a transfer layer.

FIGS. 15(a) to (d) are examples of birefringence pattern builders having an additive layer.

Figure 16:
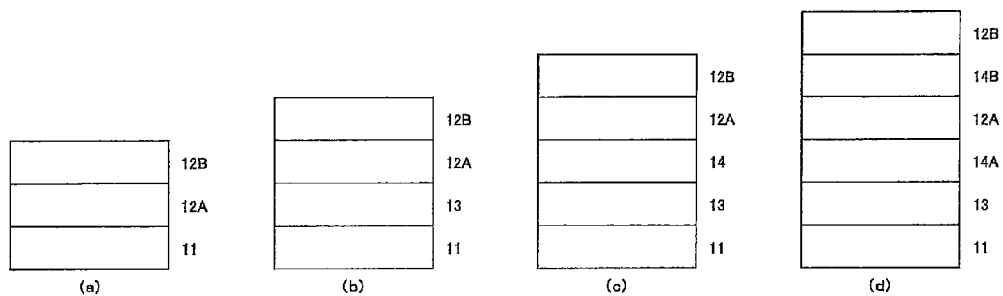
FIG. 16: Diagrams showing typical structures of birefringence pattern builders each including multiple patterned optical anisotropic layers.

The birefringence pattern builders shown in FIGS. 16(a) to (d) have multiple optically anisotropic layers. The in-plane show axes of the multiple optically anisotropic layers can be identical or different, but are preferably different. Although not shown, there may be three or more optically anisotropic layers. When forming optically anisotropic layers of liquid-crystal compounds, the presence of an orientation layer is preferable. More preferably, the orientation layer can be omitted, as shown in FIG. 16(c), by having an optically anisotropic layer double as an orientation layer. By employing a transfer-type birefringence pattern builder, the fabrication of a product having multiple layers with birefringence patterns can be facilitated.

For example, when employing the birefringence pattern builder described further below, the retardation in irradiated portions can be controlled by the level of light exposure, making it possible to achieve a retardation in unexposed portions of essentially 0.

The birefringence pattern builder, the method of manufacturing a patterned birefringent product employing the birefringence pattern builder, materials and a method of fabricating a patterned birefringent product, and the like will be described in detail below. The present invention is not limited to the embodiments described below, and implementations of other embodiments are possible by referring to the description set forth below and to conventionally known methods.

[The Optically Anisotropic Layer]

The optically anisotropic layer in the birefringence pattern builder is a layer having optical properties such that the retardation in at least one direction of incidence is essentially 0 when measured, that is, a layer that is not isotropic.

Examples of the optically anisotropic layer in the birefringence pattern builder are a layer containing at least one monomer or oligomer and their cured products; a layer containing at least one polymer; and a layer containing at least one organic or inorganic single crystal.

An optically anisotropic layer containing a polymer is preferred from the perspective of being able to satisfy various different requirements, such as birefringence, transparency, resistance to solvents, toughness, and flexibility. The polymer in the optically anisotropic layer preferably contains an unreacted reactive group. When crosslinking of polymer chains occurs due to the reaction of unreacted reactive groups when exposed to light, the degree of crosslinking of polymer chains varies due to exposure to light under different conditions. As a result, the retardation level changes, which is considered to facilitate the formation of a birefringence pattern.

The optically anisotropic layer is preferably solid at 20° C., more preferably solid at 30° C., and still more preferably, solid at 40° C. This is because the application of other functional layers, transfer and bonding to the support, and the like are facilitated when the optically anisotropic layer is solid at 20° C. For the application of other functional layers, the optically anisotropic layer preferably has resistance to solvents. In the present description, the phrase "has resistance to solvents" means that the retardation following immersion for two minutes in the target solvent falls within a range of 30% to 170%, preferably falls within a range of 50% to 150%, and optimally falls within a range of from 80% to 120% of the retardation prior to the immersion. Examples of target solvents are water, methanol, ethanol, isopropanol, acetone, methyl ethyl ketone, cyclohexanone, propylene glycol monomethyl ether acetate, N-methyl pyrrolidone, hexane, chloroform, and ethyl acetate. Preferred examples are acetone, methyl ethyl ketone, cyclohexanone, propylene glycol monomethyl ether acetate, and N-methyl pyrrolidone. Optimal examples include methyl ethyl ketone, cyclohexanone, propylene glycol monomethyl ether acetate, and mixed solvents thereof.

The optically anisotropic layer may have a retardation of 5 nm or higher at 20° C. A retardation of 10 nm or higher and 10,000 nm or lower is preferable, and a retardation of 20 nm or higher and 2,000 or lower is optimal. At a retardation of 5 nm or lower, the formation of a birefringence pattern may become difficult. When the retardation exceeds 10,000 nm, the error increases and it sometimes becomes difficult to achieve a precision permitting practical use.

The method of preparing the optically anisotropic layer is not specifically limited. Examples include: the preparation method of applying and drying a solution containing a liquid-crystal compound having at least one reactive group to form a liquid-crystal phase, and then heating it or irradiating it with light to fix it by polymerization; the preparation method of stretching a layer in which a monomer having two or more reactive groups has been fixed by polymerization; the method of stretching a layer comprised of a polymer having a reactive group in a side chain; and the method of stretching a layer comprised of a polymer and then using a coupling agent or the like to introduce a reactive group. As set forth further below, the optically anisotropic layer can be formed by transfer. The thickness of the optically anisotropic layer is preferably 0.1 to 20 micrometers and more preferably 0.5 to 10 micrometers.

[An Optically Anisotropic Layer in which a Composition Containing a Liquid-Crystal Compound has been Oriented and Fixed]

The case where the optically anisotropic layer is prepared by applying and drying a solution containing a liquid-crystal compound having at least one reactive group to form a liquid-crystal phase, and then heating it or irradiating it with light to fix it by polymerization will be described below. This preparation method is preferable to the method of preparation by stretching a polymer to obtain an optically anisotropic layer set forth further below in that it readily yields an optically anisotropic layer of equivalent retardation in a thin film.

[The Liquid-Crystal Compound]

Generally, liquid-crystal compounds can be grouped into rod-like-types and discotic-types based on their shape. Each of these also comprises low molecular and high molecular types. "High molecular" generally refers to a degree of polymerization of 100 or higher (High Molecular Physics—Phase Transition Dynamics, Masao Doi, p. 2, Iwanami Shoten, 1992), the disclosure of which is expressly incorporated by reference herein in its entirety. In the present invention, any liquid-crystal compound can be employed, but the use of a rod-like liquid-crystal compound is preferred.

In the present description, it is not necessary for a compound having liquid crystallinity to be contained in the layer that is formed from a composition containing a liquid-crystal compound. For example, the layer may contain a high-molecular weight compound, no longer exhibiting liquid crystallinity, which is formed by carrying out polymerization or crosslinking reaction of the low molecular liquid-crystal compound having a reactive group capable of thermal reaction or photo reaction under heating or under irradiation of light. Further, two or more rod-like liquid-crystal compounds, two or more discotic liquid-crystal compounds, or a mixture of a rod-like liquid-crystal compound and a discotic liquid-crystal compound can be employed as the liquid-crystal compound. Since temperature change and humidity change can be reduced, use of discotic liquid-crystal compounds or rod-like liquid-crystal compounds having reactive groups is preferable. It is of still greater preference for at least one of them to contain two or more reactive groups per liquid-crystal molecule. In the case of a mixture of two or more liquid-crystal compounds, at least one of them preferably have two or more reactive groups.

A liquid-crystal compound having two or more reactive groups with different crosslinking mechanisms is preferably employed. An optically anisotropic layer containing a polymer having an unreacted reactive group can then be prepared by causing just a portion of the two or more reactive groups to polymerize through the selection of conditions. The crosslinking mechanism is not specifically limited, and can consist of a condensation reaction, hydrogen bonding, polymerization, or the like. Of the two or more mechanisms, at least one is preferably polymerization, and the use of two or more different forms of polymerization is preferable. Generally, not only the vinyl groups, (meth)acrylic groups, epoxy groups, oxetanyl groups, and vinyl ether groups that are employed in polymerization, but also hydroxyl groups, carboxylic acid groups, amino groups, and the like can be employed in the crosslinking reaction.

In the present description, the phrase "a compound having two or more reactive groups with different crosslinking mechanisms" means a compound that can be crosslinked in stages with different crosslinking reaction steps. In the crosslinking reaction step of each stage, a reactive group reacts as a functional group according to its respective crosslinking mechanism. Further, for example, in the case of a polymer such as a polyvinyl alcohol having a hydroxyl group in a side chain, when the hydroxyl group in the side chain has been crosslinked with an aldehyde or the like following the polymerization reaction that polymerizes the polymer, two or more different crosslinking mechanisms have been employed. However, in the present description, a compound having two or more different reactive group preferably means a compound having two or more different reactive groups in a layer at the point where the layer has been formed on a support or the like, and the reactive groups therein can be subsequently crosslinked in stages. As a particularly preferable embodiment, the use of a liquid-crystal compound having two or more polymerizable groups is preferred. The reaction conditions causing crosslinking in stages can be different temperatures, different wavelengths of light (the radiation of light), or different polymerization mechanisms. From the perspective of separating the reaction, the use of different polymerization mechanisms is preferred, and control by means of the type of initiator employed is preferable. The combination of a radically polymerizable group and a cationically polymerizable group as polymerization mechanisms is preferred. A combination in which the radically polymerizable group is a vinyl group or (meth)acrylic group, and the cationically polymerizable group is an epoxy group, oxetanyl group, or vinyl ether group is particularly preferred because of the ease of controlling the polymerization properties. Examples of reactive groups are given below.

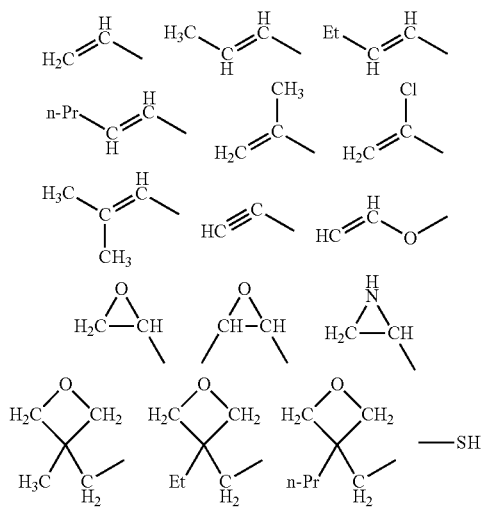

-continued

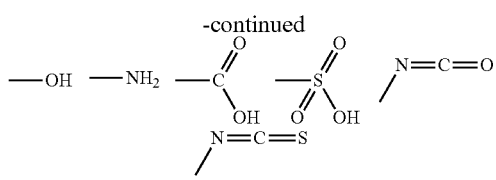

Azomethines, azoxy compounds, cyanobiphenyls, cyanophenyl esters, benzoic acid esters, cyclohexane carboxylic acid phenyl esters, cyanophenyl cyclohexanes, cyano-substituted phenyl pyrimidines, alkoxy-substituted phenyl pyrimidines, phenyl dioxanes, tolanes, and alkenyl cyclohexylbenzonitriles are preferably employed as rod-like liquid-crystal compounds. Not only low molecular liquid-crystal compounds such as the above, but high molecular liquid-crystal compounds can also be employed. These high molecular liquid-crystal compounds are obtained by polymerizing low molecular rod-like liquid-crystal compounds having a reactive group. Examples of rod-like liquid-crystal compounds are those described in Japanese Unexamined Patent Publication (KOKAI) No. 2008-281989, Published Japanese Translation (TOKUHYO) Heisei No. 11-513019 of a PCT International Application (WO97/00600), and Published Japanese Translation (TOKUHYO) No. 2006-526165 of a PCT International Application (WO2004/090025), the disclosures of which are expressly incorporated by reference herein in their entireties.

Specific examples of rod-like liquid-crystal compounds are given below. However, the present invention is not limited thereto. The compounds represented by general formulas (I)-1 to 7 can be synthesized by the method described in Published Japanese Translation (TOKUHYO) Heisei No. 11-513019 of a PCT International Application (WO97/00600), the disclosure of which is expressly incorporated by reference herein in its entirety.

I-1

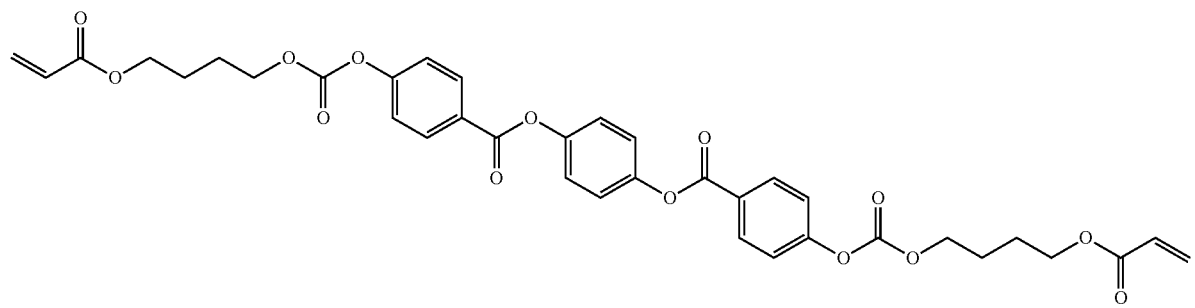

I-2

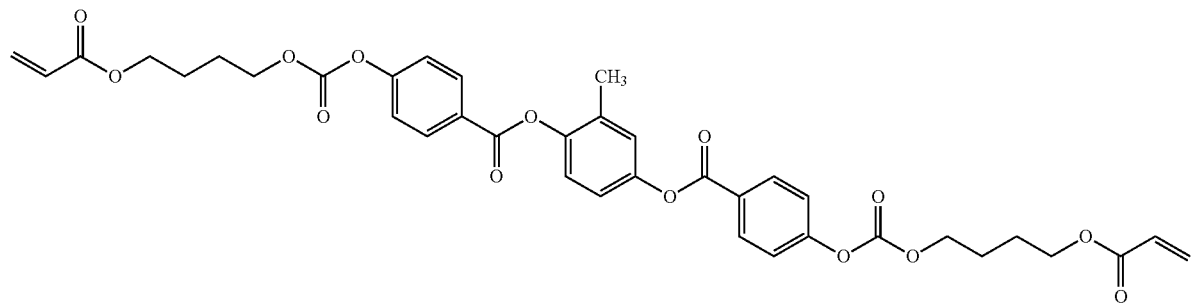

I-3

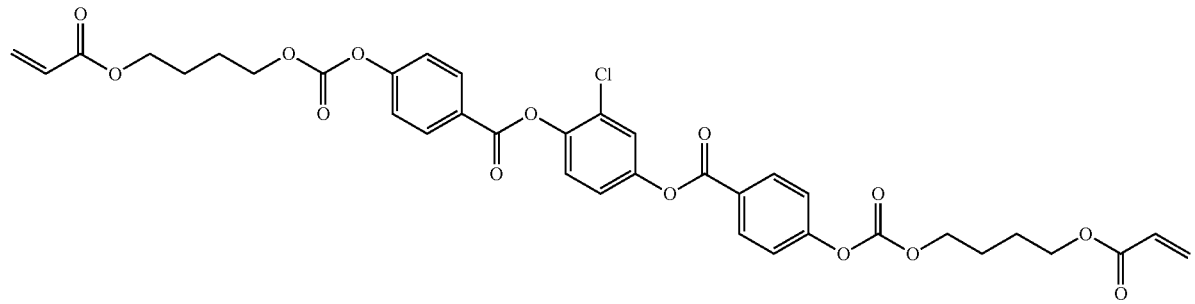

-continued
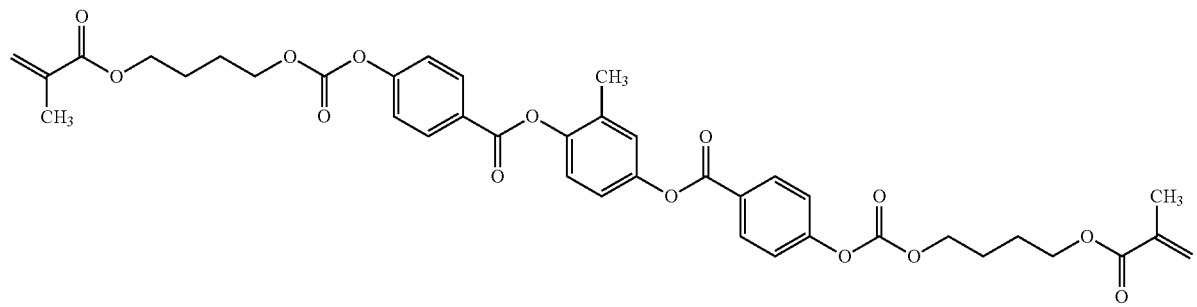
I-4
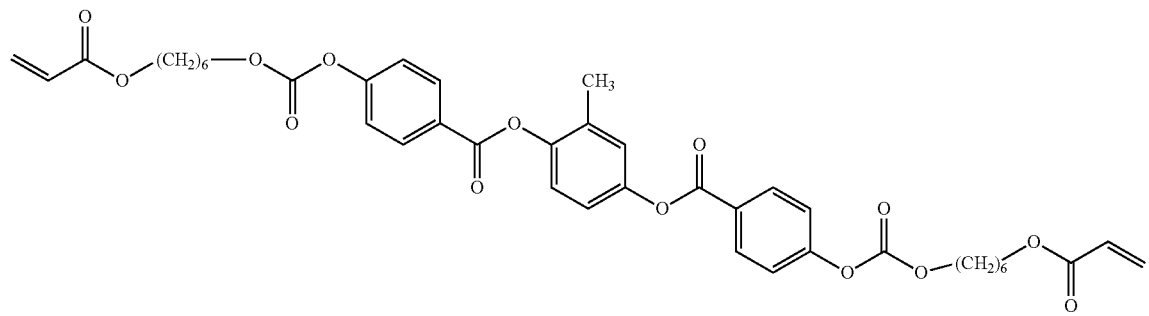
I-5
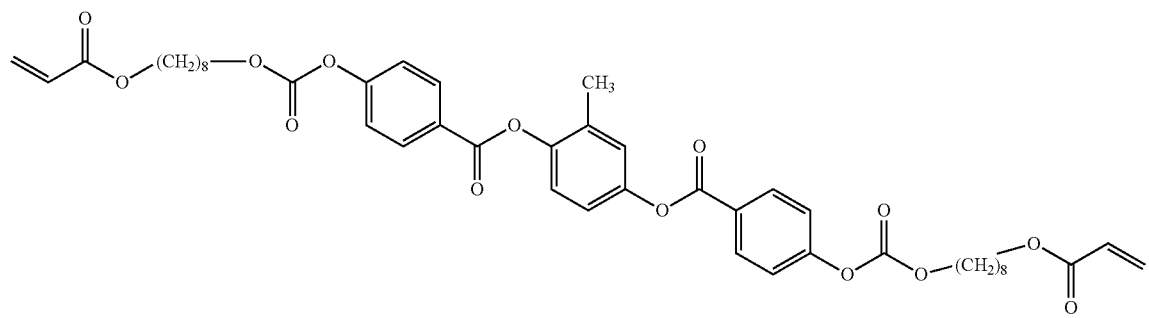
I-6
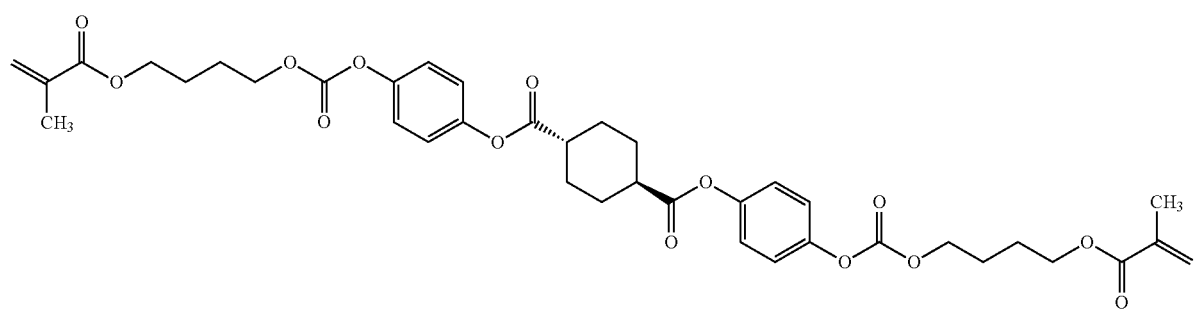
I-7
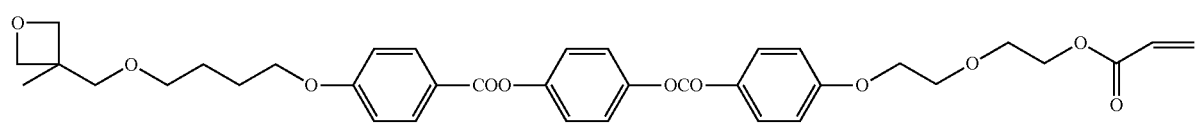
I-8
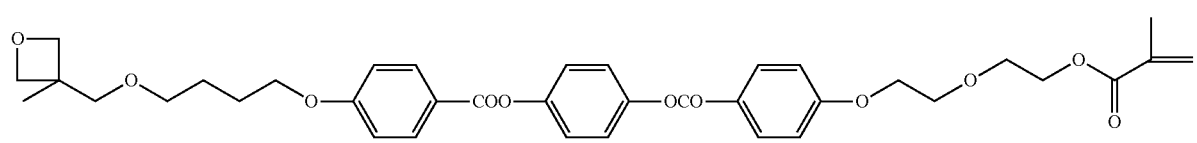
I-9

-continued
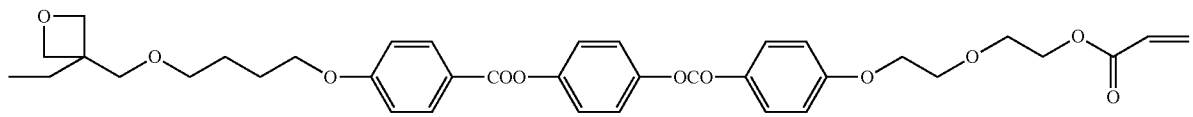
I-10
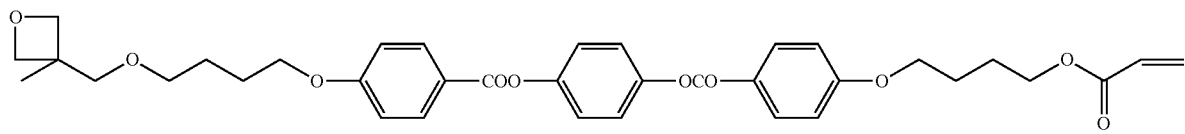
I-11
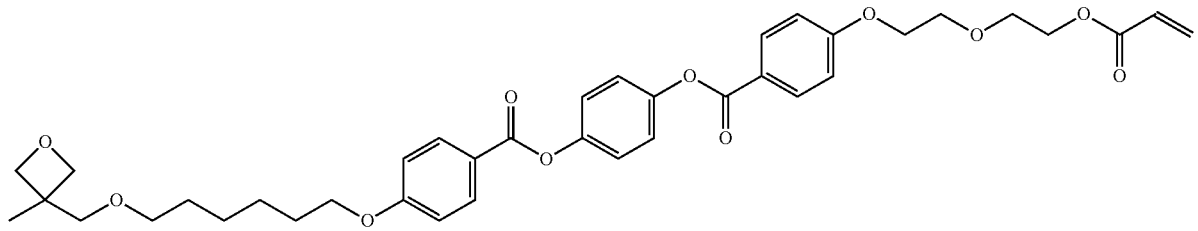
I-12
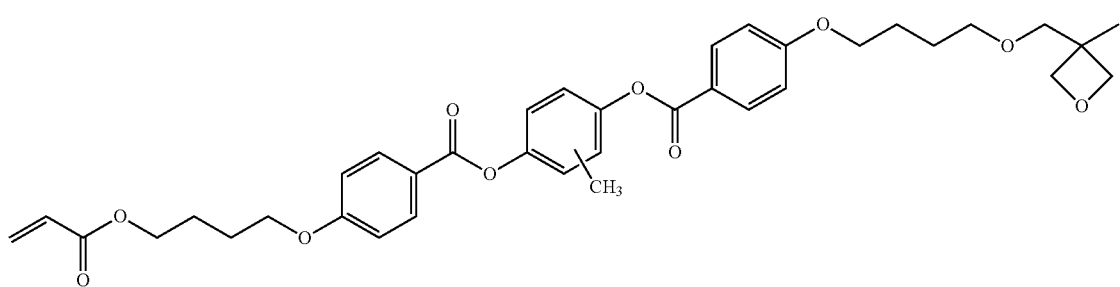
I-13
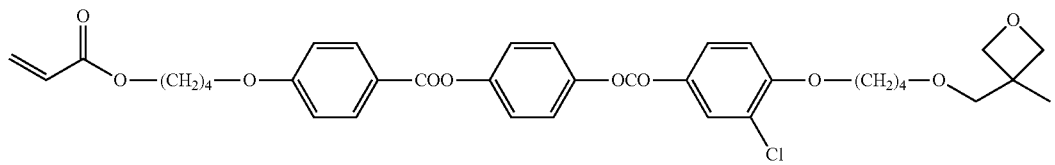
I-14
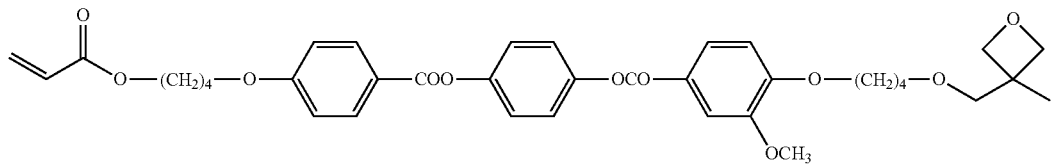
I-15
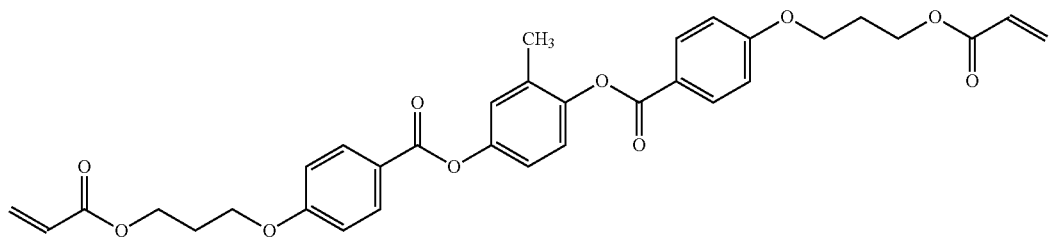
I-16

-continued

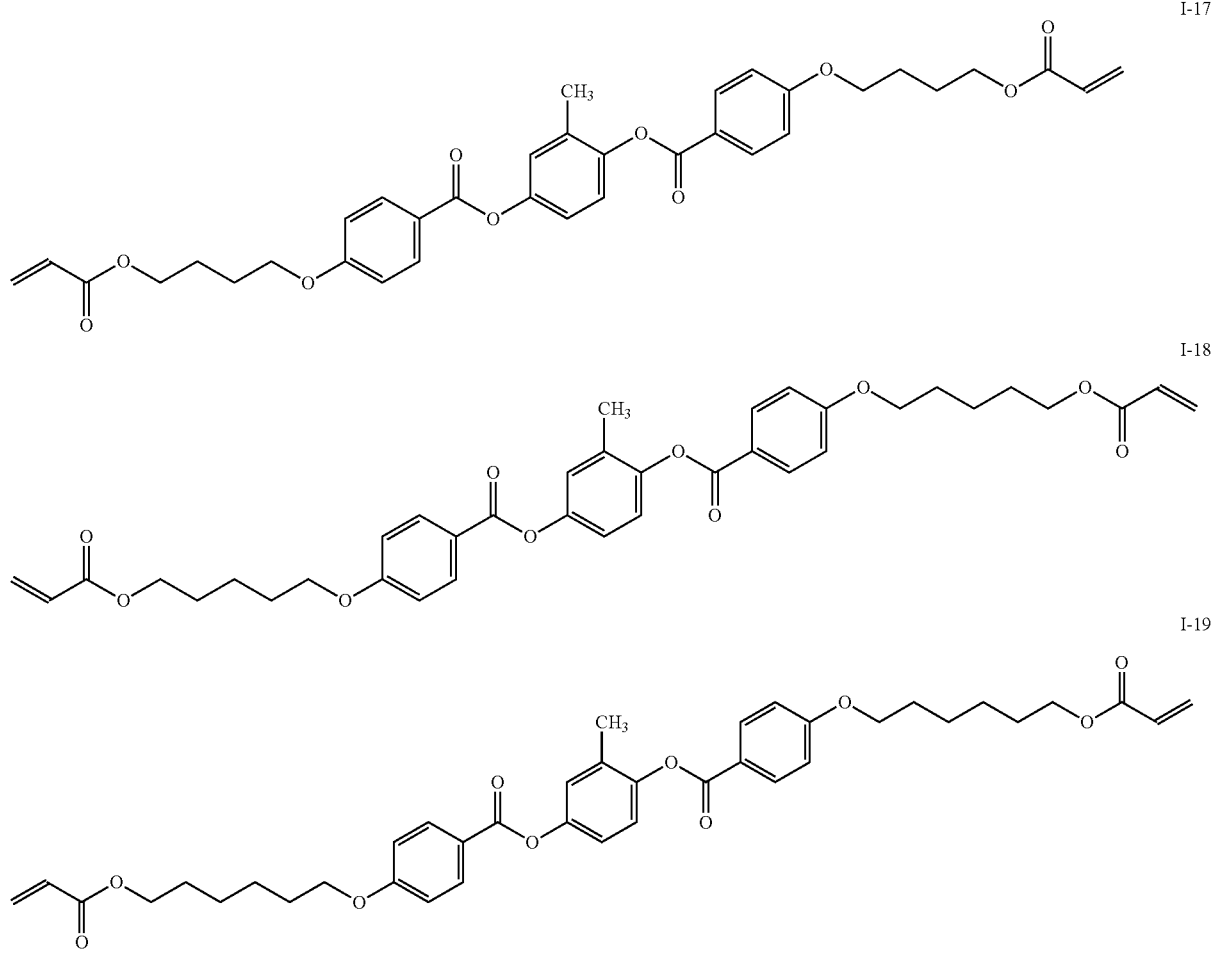

In another embodiment of the present invention, discotic liquid crystals are employed in the optically anisotropic layer. The optically anisotropic layer is preferably a layer of low-molecular-weight discotic liquid-crystal compounds such as monomers, or a layer of polymers obtained by polymerizing (curing) polymerizable discotic liquid-crystal compounds. Examples of discotic liquid-crystal compounds include the benzene derivatives described in the research report of C. Destrade et al., Mol. Cryst. Vol. 71, p. 111 (1981); the truxene derivatives described in the research report of C. Destrade et al., Mol. Cryst. Vol. 122, p. 141 (1985), Physics Lett, A, Vol. 78, p. 82 (1990); the cyclohexane derivatives described in the research report of B. Kohne at el., Angew. Chem. Vol. 96, p. 70 (1984); and the aza crown and phenyl acetylene macrocycles described in the research report of J. M. Lehn et al., J. Chem. Commun., p. 1,794 (1985) and the research report of J. Zhang et al., J. Am. Chem. Soc., Vol. 116, p. 2,655 (1994), and the disclosures of the above publications are expressly incorporated by reference herein in their entireties. These discotic liquid-crystal compounds generally have a structure with a discotic base nucleus at the center of the molecule, and groups (L), such as linear alkyl groups, alkoxy groups, and substituted benzoyloxy groups, substituted radially. They exhibit liquid crystallinity, and include all compounds generally referred to as discotic liquid crystals. When an aggregate of such molecules is oriented uniformly, it exhibits a negative uniaxial property. However, this description is not a limitation. The compounds described in paragraphs [0061]-[0075] of Japanese Unexamined Patent Publication (KOKAI) No. 2008-281989, the disclosure of which is expressly incorporated by reference herein in its entirety, are examples of discotic liquid-crystal compounds.

When employing a discotic liquid-crystal compound having a reactive group as a liquid-crystal compound, it can be fixed in any of the orientation states of horizontal orientation, vertical orientation, inclined orientation, and twisted orientation.

[Polymerizable Monomer]

In the composition containing a liquid-crystal compound that is used to form the optically anisotropic layer, a polymerizable monomer can be added to promote crosslinking of the liquid-crystal compound.

A monomer or oligomer undergoing addition polymerization when irradiated with light and having two or more ethylenic unsaturated double bonds can be employed as the polymerizable monomer, for example.

Examples of such monomers and oligomers are compounds having at least one addition polymerizable ethylenic unsaturated group per molecule. Examples are monofunctional acrylates and monofunctional methacrylates such as polyethylene glycol mono(meth)acrylate, polypropylene glycol mono(meth)acrylate, and phenoxyethyl (meth)acrylate; and polyfunctional acrylates and polyfunctional methacrylates such as compounds that have been (meth)acrylated after adding an ethylene oxide or propylene oxide to a polyfunctional alcohol such as trimethylolpropane or glycerin: polyethylene glycol di(meth)acrylate, polypropylene glycol di(meth)acrylate, trimethylol ethane triacrylate, trimethylol propane tri(meth)acrylate, trimethylol propane diacrylate, neopentyl glycol di(meth)acrylate, pentaerythritol tetra (meth)acrylate, pentaerythritol tri(meth)acrylate, dipentaerythritol hexa(meth)acrylate, dipentaerythritol penta(meth)acrylate, hexane diol di(meth)acrylate, trimethylol propane tri(acryloyloxypropyl)ether, tri(acryloyloxyethyl) isocyanurate, tri(acryloyloxyethyl)cyanurate, and glycerin tri (meth)acrylate.

Further examples are the urethane acrylates described in Japanese Examined Patent Publication (KOKOKU) Showa No. 48-41708, Japanese Examined Patent Publication (KOKOKU) Showa No. 50-6034, and Japanese Unexamined Patent Publication (KOKAI) Showa No. 51-37193; the polyester acrylates described in Japanese Unexamined Patent Publication (KOKAI) Showa No. 48-64183, Japanese Examined Patent Publication (KOKOKU) Showa No. 49-43191 and Japanese Examined Patent Publication (KOKOKU) Showa No. 52-30490; and polyfunctional acrylates and methacrylates such as epoxyacrylates that are the reaction products of an epoxy resin with (meth)acrylic acid, and the disclosures of the above publications are expressly incorporated by reference herein in their entireties.

Of these, trimethylol propane tri(meth)acrylate, pentaerythritol tetra(meth)acrylate, dipentaerythritol hexa(meth) acrylate, and dipentaerythritol penta(meth)acrylates are preferred.

An additional suitable example is the "polymerizable compound B" described in Japanese Unexamined Patent Publication (KOKAI) Heisei No. 11-133600, the disclosure of which is expressly incorporated by reference herein in its entirety.

These monomers and oligomers can be employed singly or in mixtures of two or more.

Cationically polymerizable monomers can also be employed. Examples include the epoxy compounds, vinyl ether compounds, oxetane compounds and the like that are given by way of example in Japanese Unexamined Patent Publications (KOKAI) Heisei No. 6-9714, No. 2001-31892, No. 2001-40068, No. 2001-55507, No. 2001-310938, No. 2001-310937, and No. 2001-220526, the disclosures of which are expressly incorporated by reference herein in their entireties.

Examples of epoxy compounds include the aromatic epoxides, alicyclic epoxides, and aliphatic epoxides given below.

Examples of aromatic epoxides include bisphenol A, di- or polyglycidyl ethers of alkyleneoxide adducts thereof, hydrogenated bisphenol A and di- or polyglycidyl ethers of alkylene oxide adducts thereof, and novolac epoxy resins. Examples of alkylene oxides are ethylene oxide and propylene oxide.

Examples of alicyclic epoxides include cyclohexene oxide and cyclopentene oxide-containing compounds obtained by epoxylating a compound having at least one cycloalkane ring such as a cyclohexene or cyclopentene ring with a suitable oxidizing agent such as hydrogen peroxide or peroxide.

Preferred examples of aliphatic epoxides include aliphatic polyalcohols and di- and polyglycidyl ethers of alkylene oxide adducts thereof. Representative examples include: diglycidyl ethers of ethylene glycol, diglycidyl ethers of propylene glycol, diglycidyl ethers of 1,6-hexanediol, and other diglycidyl ethers of alkylene glycols; polyglycidyl ethers of polyalcohols such as di- or tri-glycidyl ethers of glycerin or alkylene oxide adducts thereof; diglycidyl ethers of polyethylene glycols or alkylene oxide adducts thereof; diglycidyl ethers of polypropylene glycol or alkylene oxide adducts thereof; and other diglycidyl ethers of polyalkylene glycols. Examples of the alkylene oxide include ethylene oxide and propylene oxide.

A monofunctional or difunctional oxetane monomer can be employed as a cationically polymerizable monomer in the composition of the present invention. For example, compounds such as 3-ethyl-3-hydroxymethyloxetane (product name OXT101 manufactured by Toagosei Co., Ltd.), 1,4-bis [(3-ethyl-3-oxetanyl)methoxy-methyl]benzene (OXT121, same manufacturer), 3-ethyl-3-(phenoxymethyl)oxetane (OXT211, same manufacturer), di(1-ethyl-3-oxetanyl)methylether (OXT221, same manufacturer), and 3-ethyl-3-(2-ethylhexyloxymethyl)oxetane (OXT212, same manufacturer) are preferably employed. In particular, compounds such as 3-ethyl-3-hydroxymethyloxetane, 3-ethyl-3-(phenoxymethyl)oxetane, and di(1-ethyl-3-oxetanyl)methylether, and all known functional and difunctional oxetane compounds described in Japanese Unexamined Patent Publication (KOKAI) Nos. 2001-220526 and 2001-310937, the disclosures of which are expressly incorporated by reference herein in their entireties, can be employed.

[Two or More Optically Anisotropic Layers]

When two or more optically anisotropic layers each of which is comprised of a composition containing liquid-crystal compounds is laminated, the combination of the liquid-crystal compounds is not specifically limited. Laminates of layers all comprised of rod-like liquid-crystal compounds, laminates of layers comprised of compositions containing discotic liquid-crystal compounds and compositions containing rod-like liquid-crystal compounds, and laminates of layers all comprised of discotic liquid-crystal compounds can all be employed. Nor is the combination of the orientation state of the various layers specifically limited. Laminates of optically anisotropic layers of identical orientation states can be employed, and laminates of optically anisotropic layers of differing orientation states can be employed.

[The Solvent]

An organic solvent is preferably used to prepare a coating liquid, which is used when the composition containing a liquid-crystal compound is applied on the surface of a support or an orientation layer or the like in the form of the coating liquid, described further below. Examples of organic solvents include: amides (such as N,N-dimethylformamide), sulfoxides (such as dimethylsulfoxide), heterocyclic compounds (such as pyridine), hydrocarbons (such as benzene and hexane), alkyl halides (such as chloroform and dichloromethane), esters (such as methyl acetate and butyl acetate), ketones (such as acetone, methyl ethyl ketone, methyl isobutyl ketone, and cyclohexanone), and ethers (such as tetrahydrofuran and 1,2-dimethoxyethane). The alkyl halides and ketones are preferred. Two or more organic solvents can be employed in combination.

[Fixing the Orientation]

The orientation of the liquid-crystal compound is preferably fixed by a crosslinking reaction of reactive groups introduced into the liquid-crystal compound, and more preferably fixed by a polymerization reaction of reactive groups. Polymerization reactions include a thermal polymerization reaction employing a thermal polymerization initiator and a photopolymerization reaction employing a photopolymerization initiator. A photopolymerization reaction is preferred. The photopolymerization reaction can be a radical polymerization or a cation polymerization. Examples of radical polymerization initiators include α-carbonyl compounds (described in U.S. Pat. Nos. 2,367,661 and 2,367,670), acyloin ethers (described in U.S. Pat. No. 2,448,828), α-hydrocarbon-substituted aromatic acyloin compounds (described in U.S. Pat. No. 2,722,512), polynucleic quinone compounds (described in U.S. Pat. Nos. 3,046,127 and 2,951,758), combinations of triarylimidazole dimers and p-aminophenyl ketones (described in U.S. Pat. No. 3,549,367), acrylidine and phenazine compounds (described in Japanese Unexamined Patent Publication (KOKAI) Showa No. 60-105667 and U.S. Pat. No. 4,239,850), and oxadiazole compounds (described in U.S. Pat. No. 4,212,970), and the disclosures of the above patents and publications are expressly incorporated by reference herein in their entireties. Examples of cation photopolymerization initiators include organic sulfonium salts, iodonium salts, and phosphonium salts. The organic sulfonium salts are preferred, and triphenylsulfonium salts are particularly preferred. Hexafluoroantimonate, hexafluorophosphate, and the like are preferably employed as the counter ions of these compounds.

The quantity of photopolymerization initiator employed is preferably 0.01 to 20 weight %, more preferably 0.5 to 5 weight % of the solid component of the coating liquid. Ultraviolet radiation is preferably employed in the light irradiation to polymerize the liquid-crystal compound. The irradiation energy is preferably 10 mJ/cm$^2$ to 10 J/cm$^2$, more preferably 25 to 800 mJ/cm$^2$. The illuminance is preferably 10 to 1,000 mW/cm$^2$, more preferably 20 to 500 mW/cm$^2$, and still more preferably, 40 to 350 mW/cm$^2$. The illumination wavelength preferably has a peak at 250 to 450 nm, and more preferably has a peak at 300 to 410 nm. To promote the photopolymerization reaction, the photoillumination can be conducted in an atmosphere of an inert gas such as nitrogen or under heated conditions.

[Optical Orientation by Irradiation with Polarized Light]

The optically anisotropic layer can be a layer in which in-plane retardation is manifested or increased by optical orientation by irradiation with polarized light. Irradiation with polarized light can be conducted by referring to the description given in paragraphs [0091] and [0092] of Japanese Unexamined Patent Publication (KOKAI) No. 2009-69793, the description given in Published Japanese Translation (TOKUHYO) No. 2005-513241 of a PCT International Application (International Publication WO2003/054111), and the like, the disclosures of which are expressly incorporated by reference herein in their entireties.

[Fixing the Orientation State of a Liquid-Crystal Compound Having a Radically Reactive Group and a Cationically Reactive Group]

As set forth above, the liquid-crystal compound preferably has two or more reactive groups of differing polymerization conditions. In that case, an optically anisotropic layer containing a polymer having an unreacted reactive group can be prepared by polymerizing only a portion of the multiple types of reactive groups through the selection of conditions. Polymerization fixing conditions that are particularly suited to the case where a liquid-crystal compound having a radically reactive group and a cationically reactive group (specific examples of which are I-8 to I-15 above) is employed as such a liquid-crystal compound are described below.

First, it is preferable to employ only a photopolymerization initiator acting on the reactive group that is to be polymerized. That is, when selectively polymerizing a radically reactive group, it is preferable to employ only a radical photopolymerization initiator, and when selectively polymerizing a cationically reactive group, it is preferable to employ only a cation photopolymerization initiator. The quantity of photopolymerization initiator that is employed is preferably 0.01 to 20 weight %, more preferably 0.1 to 8 weight %, and still more preferably, 0.5 to 4 weight % of the solid component of the coating liquid.

Next, ultraviolet radiation is preferably used for the irradiation to induce polymerization. In this process, when the irradiation energy and/or illuminance is excessive, there is a risk that both the radically reactive group and the cationically reactive group will end up reacting non-selectively. Accordingly, the irradiation energy is preferably 5 to 500 mJ/cm$^2$, more preferably 10 to 400 mJ/cm$^2$, and still more preferably, 20 to 200 mJ/cm$^2$. The illuminance is preferably 5 to 500 mW/cm$^2$, more preferably 10 to 300 mW/cm$^2$, and more preferably, 20 to 100 mW/cm$^2$. The illumination wavelength preferably has a peak at 250 to 450 nm, and more preferably has a peak at 300 to 410 nm.

Among photopolymerization reactions, reactions employing radical photopolymerization initiators are impeded by oxygen and reactions employing cation photopolymerization initiators are not. Accordingly, when employing a liquid-crystal compound having a radically reactive group and a cationically reactive group and selectively polymerizing one of the reactive groups, it is preferable to conduct the irradiation in an atmosphere of an inert gas such as nitrogen when selectively polymerizing the radically reactive group, and preferable to conduct the irradiation in an atmosphere containing oxygen (such as air) when selectively polymerizing the cationically reactive group.

Further, when a liquid-crystal compound having a radically reactive group and a cationically reactive group are employed and one of the reactive groups is selectively polymerized, a polymerization inhibitor on the other reactive group can be preferably employed as a means of selective polymerization of the former. For example, when a liquid-crystal compound having a radically reactive group and a cationically reactive group is employed and the cationically reactive group is selectively polymerized, a small quantity of radical polymerization inhibitor can be added to enhance the selectivity. The quantity of such a polymerization inhibitor that is added is preferably 0.001 to 10 weight %, more preferably 0.005 to 5 weight %, and still more preferably, 0.02 to 1 weight % of the solid component of the coating liquid. Examples of radical polymerization inhibitors are nitrobenzene, phenothiazine, and hydroquinone. The hindered phenols that are commonly employed as oxidation inhibitors are also effective as radical polymerization inhibitors.

[Horizontal Orientation Agents]

Incorporating at least one from among the compounds represented by general formulas (1) to (3) and fluorine-containing homopolymers and copolymers employing the monomer of general formula (4) described in paragraphs [0098] to [0105] in Japanese Unexamined Patent Publication (KOKAI) No. 2009-69793, the disclosure of which is expressly incorporated by reference herein in its entirety, into the composition for forming the above optically anisotropic layer essentially horizontally orients the molecules of the liquid-crystal compound. In the present description, the term "horizontal orientation" refers, in the case of rod-like liquid crystals, to the major axis of the molecule being parallel to the horizontal surface of the support, and refers, in the case of discotic liquid crystals, to the disc surface of the core of the discotic liquid crystal compound being parallel to the horizontal surface of the support. However, it is not required that they be strictly parallel; in the present description, this refers to an orientation with an angle of incline relative to the horizontal surface of less than 10 degrees, preferably to an angle of incline of 0 to 5 degrees, more preferably to an angle of incline of 0 to 3 degrees, still more preferably to an angle of incline of 0 to 2 degrees, and optimally, to an angle of incline of 0 to 1 degree.

The quantity of the horizontal orientation agent is preferably 0.01 to 20 weight %, more preferably 0.01 to 10 weight %, and still more preferably, 0.02 to 1 weight % of the weight of the liquid-crystal compound. The compounds represented by general formulas (1) to (4) described in paragraphs [0098] to [0105] in Japanese Unexamined Patent Publication (KOKAI) No. 2009-69793 can be employed singly or in combinations of two or more.

[An Optically Anisotropic Layer Prepared by Stretching]

The optically anisotropic layer can be prepared by stretching a polymer. The optically anisotropic layer preferably contains at least one unreacted reactive group. When preparing such a polymer, a polymer that already has reactive groups can be stretched, or a coupling agent or the like can be employed on the optically anisotropic layer to introduce a reactive group after stretching. An optically anisotropic layer obtained by stretching is characterized by low cost, self-supporting capability (obviating the need for a support to form and maintain the optically anisotropic layer), and the like.

[Two or More Optically Anisotropic Layers]

As described above, birefringence pattern builders can contain two or more optically anisotropic layers. The two or more optically anisotropic layers can be adjacent in the normal direction, or a functional layer can be sandwiched between them. The retardation of the two or more optically anisotropic layers can be approximately equivalent, or can be different. The slow axes can be approximately identically oriented, or can be oriented in different directions. By using two or more optically anisotropic layers the slow axes of which are oriented in approximately identical directions, a pattern with a high degree of retardation can be prepared.

A birefringence pattern builder having two or more optically anisotropic layers can be prepared, for example, by the methods of directly forming an optically anisotropic layer on a birefringence pattern builder, and by employing a separate birefringence pattern builder as a transfer material to transfer an optically anisotropic layer onto a birefringence pattern builder. Of these methods, the method of employing a separate birefringence pattern builder as a transfer material to transfer an optically anisotropic layer onto a birefringence pattern builder is preferred.

[After-Treatment of the Optically Anisotropic Layer]

Various after-treatments can be used to modify the optically anisotropic layer that has been prepared. Examples of after-treatments include corona treatment to enhance adhesion, the addition of plasticizers to enhance flexibility, the addition of thermal polymerization inhibitors to enhance storage properties, and coupling processing to enhance reactivity. When the polymer in the optically anisotropic layer has an unreacted reactive group, the addition of a polymerization initiator corresponding to the reactive group is an effective means of modification. For example, by the addition of a radical photopolymerization initiator to an optically anisotropic layer in which the orientation of a liquid-crystal compound containing cationically reactive groups and radically reactive groups has been fixed with a cation photopolymerization initiator, the reaction of the unreacted radically reactive group can be promoted when patterned light exposure is subsequently conducted. Examples of means of adding plasticizers and photopolymerization initiators include immersing the optically anisotropic layer in a solution of the corresponding additive, and applying a solution of the corresponding additive on the optically anisotropic layer to permeate it. A method using an additive layer can also be employed, in which, when applying another layer on the optically anisotropic layer, the additive is first added to a coating liquid of the other layer, and then the additive is caused to permeate the optically anisotropic layer. In this process, it is possible to adjust the relation between the level of exposure of individual regions during patterned light exposure of the birefringence pattern builder, described further below, and the final retardation of the various regions that is achieved, and approximate desired material properties based on the additive that is used in the permeation, particularly the type and quantity of photopolymerization initiator.

The additive layer that is formed on the optically an isotropic layer can also functions as a photosensitive resin layer such as a photoresist, a surface layer such as a scattering layer that controls reflective gloss, a hardcoat layer that prevents scratching of the surface, a water-repellent and oil-repellent layer that prevents the sticking of fingerprints and doodling with markers and the like, or an antistatic layer that prevents the adhesion of debris due to charge buildup. At least one polymer and at least one photopolymerization initiator are preferably contained in a photosensitive resin layer. The polymer is not specifically limited, but a material with a high Tg is preferred to impart hardcoat properties.

[The Support]

The birefringence pattern builder may have a support to ensure dynamic stability. The support in the birefringence pattern builder can serve as a support in the patterned birefringent product, or the support in the patterned birefringent product can be provided separately from the support in the birefringence pattern builder (by replacement of or addition to the support in the birefringence pattern builder during or after the formation of the birefringence pattern). The support is not specifically limited. Both rigid and flexible supports can be employed. There are no specific limitations on rigid supports. Examples include a soda glass sheet with a silicon oxide surface coating, low-expansion glass, nonalkali glass, quartz glass sheets, and other known glass sheets; aluminum plates, iron plates, SUS plates, and other metal plates; resin sheets; ceramic sheets; and stone sheets. There are no specific limitations on flexible supports. Examples include cellulose esters (such as cellulose acetate, cellulose propionate, and cellulose butyrate), polyolefins (such as norbornene polymers), poly(meth)acrylic acid esters (such as polymethyl methacrylate), polycarbonates, polyesters, polysulfones, norbornene polymers, other plastic films, paper, aluminum foil, and cloth. Due to ease of handling, the thickness of the rigid support is preferably 100 to 3,000 micrometers, more preferably 300 to 1,500 micrometers. The thickness of the flexible support is preferably 3 to 500 micrometers, and more preferably, 10 to 200 micrometers. The support preferably has heat resistance adequate to prevent deformation and coloration during baking, described further below. Instead of the semi-transmissive-half-reflective layer described further below, it may also preferable for the support to have a semi-transmissive-half-reflective function.

[The Orientation Layer]

As set forth above, an orientation layer can be employed in the formation of the optically anisotropic layer. The orientation layer is generally provided on the support or temporary support, or on an undercoating layer that is applied on the support or temporary support. The orientation layer functions to determine the orientation of the liquid-crystal compound provided on it. The orientation layer can be any layer that imparts an orientation to the optically anisotropic layer. Preferred examples of the orientation layer include rubbed layers of organic compounds (preferably polymers); optical orientation layers that exhibit a liquid-crystal orienting property by irradiation with polarized light, such as azobenzene polymers and polyvinyl cinnamate; oblique vapor-deposition layers of inorganic compounds; microgrooved layers; cumulative films of omega-tricosanoic acid, dioctadecyl methyl ammonium chloride, methyl stearate or the like formed by the Langmuir-Blodgett method (LB method); and films in which a dielectric is oriented by imparting an electric or magnetic field. In the rubbed form of orientation films, polyvinyl alcohol is preferably contained, and the ability to crosslink with at least one layer either above or below the orientation layer is particularly preferred. An optical orientation layer and microgrooves are preferred as methods of controlling the direction of orientation. Compounds that exhibit orientation based on dimers, such as polyvinyl cinnamate, are particularly preferred as optical orientation layers. Embossing with a master roll manufactured in advance by mechanical or laser processing is particularly preferable for microgrooves. By employing an optical orientation layer, birefringence pattern can be developed by providing an orientation direction in a patterned manner in the orientation layer without a need for conducting the patterned light exposure on an optical anisotropic layer as described below (See Example 7).

[The Semi-Transmissive-Half-Reflective Layer]

The semi-transmissive-half-reflective layer is not specifically limited, but preferably does not have a depolarization property. Examples include metal layers such as aluminum and silver, multilayered films of dielectrics, and printed layers with gloss. In the semi-transmissive-half-reflective layer used in the present invention, a transmittance may be 30% or higher, preferably 35% or higher, more preferably 45% or higher, and reflectance may be 30% or higher, preferably 35% or higher, more preferably 45% or higher. When the semi-transmissive-half-reflective layer is a vapor deposited aluminum on a polymer film as a support, the above transmittance and reflectance are calculated based on a value measured by using a layer consisting of the polymer film and the vapor deposited aluminum layer. A semi-transmissive-half-reflective layer can be preferably manufactured by the method of reducing the thickness of the metal layer, which is inexpensive. A semi-transmissive-half-reflective layer of metal absorbs light. Thus, a dielectric multilayer film that permits control of transmission and reflection without absorption is preferred from the perspective of light-use efficiency. A semi-transmissive-half-reflective layer having a wave length selectivity based on a cholesteric liquid crystal or a semi-transmissive-half-reflective layer based on a hologram can also be used.

The semi-transmissive-half-reflective layer can be provided after birefringence pattern formation.

[The Adhesive Layer]

The birefringence pattern builder can have an adhesive layer for adhering the patterned birefringent product that has been prepared to other products after the patterned light exposure and baking described further below. The material of the adhesive layer is not specifically limited, but a material that retains adhesiveness even after the baking step in the production of a birefringence pattern is preferred. The adhesive layer can be formed on the patterned birefringent product after formation of the birefringence pattern.

[The Coating Method]

Various layers such as the optically anisotropic layer and the orientation layer can be formed by application of a coating solution by the dip coating method, air knife coating method, spin coating method, slit coating method, curtain coating method, roller coating method, wire bar coating method, gravure coating method, and extrusion coating method (U.S. Pat. No. 2,681,294, the disclosure of which is expressly incorporated by reference herein in its entirety). Two or more layers can be simultaneously applied. Simultaneous application methods are described in U.S. Pat. Nos. 2,761,791, 2,941,898, 3,508,947, and 3,526,528, and in Yuji Harazaki, Coating Technology, p. 253, Asakura Shoten (1973), the disclosures of which are expressly incorporated by reference herein in their entireties.

[Preparation of a Patterned Birefringent Product]

A patterned birefringent product can be prepared by at least sequentially patterned light exposing and heating (baking) a birefringence pattern builder.

[Patterned Light Exposure]

In the present description, the term "patterned light exposure" means exposure conducted in a manner that some of the regions of a birefringence pattern builder are exposed to light or exposure conducted under different exposure conditions in two or more regions. In exposures conducted under different exposure conditions to each other, no exposure (unexposed regions) may be included. The patterned light exposure technique employed can be contact exposure with a mask, proximity exposure, projection exposure, or the like. Scanning exposure in which a laser, electron beam, or the like is focused on a determined position, without employing a mask, to directly draw an image can also be employed. The illumination wavelength of the light source used in exposure preferably has a peak at 250 to 450 nm, and more preferably, has a peak at 300 to 410 nm. Specific examples include ultra-high-pressure mercury lamps, high-pressure mercury lamps, metal halide lamps, and blue lasers. The preferred exposure level is normally about 3 to 2,000 mJ/cm$^2$, more preferably about 5 to 1,000 mJ/cm$^2$, and optimally, about 10 to 500 mJ/cm$^2$. The resolution in patterned light exposure is preferably 1,200 dpi or higher to permit the formation of a microprint latent image. To increase the resolution, it is preferable and necessary for the patterned optically anisotropic layer to be solid during patterned light exposure, and for the thickness to be 10 micrometers or less. To achieve a thickness of 10 micrometers or less, the patterned optically anisotropic layer is preferably formed of a layer containing a polymerizable liquid-crystal compound the orientation of which has been fixed. More preferably, the polymerizable liquid-crystal compound contains two or more types of reactive groups with different crosslinking mechanisms.

[The Exposure Conditions During Patterned Light Exposure]

In the course of conducting the exposure of two or more regions of the birefringence pattern builder under mutually different exposure conditions, the "two or more regions" may or may not have overlapping portions. However, the regions preferably do not have overlapping portions. Patterned light exposure can be conducted in multiple exposure cycles; can be conducted for example in a single exposure cycle using a mask or the like having two or more regions exhibiting different transmission spectra based on the region; or the two can be combined. That is, during patterned light exposure, exposure can be conducted such that two or more regions that have been exposed under different exposure conditions are produced. The scanning exposure is preferable because, in the scanning exposure, the exposure conditions can be varied for each region by the techniques of varying the light source intensity by exposure region, changing the illumination spots of the exposure regions, changing the scan rate, and the like.

The exposure conditions are not specifically limited. Examples include the peak exposure wavelength, the exposure illuminance, the exposure time, the exposure level, the temperature during exposure, and the atmosphere during exposure. Of these, from the perspective of the ease of adjusting exposure conditions, the peak exposure wavelength, the exposure illuminance, the exposure time, and the exposure level are preferred, and the exposure illuminance, exposure time, and exposure level are more preferred. The regions that are exposed under mutually different exposure conditions during patterned light exposure are subsequently subjected to a baking step and exhibit mutually different birefringence that is controlled based on the exposure conditions. In particular, different retardation values are imparted to the regions. That is, by adjusting the exposure conditions for each region during patterned light exposure, a birefringence pattern of desired retardation that differs by region can be obtained after the baking step. The exposure conditions can be varied continuously or discontinuously between two or more exposure regions being exposed under different exposure conditions.

[Mask Exposure]

Exposure employing an exposure mask is useful as a means of producing exposure regions under different exposure conditions. For example, exposure can be conducted with an exposure mask so that only one region is exposed. Then exposure with a separate mask or total surface exposure can be conducted with the temperature, atmosphere, exposure illuminance, exposure time, and exposure wavelength changed. In this manner, exposure conditions of the region exposed first and the regions subsequently exposed can be readily changed. Masks having two or more regions exhibiting different transmission spectra to each other are particularly useful as masks for changing the exposure illuminance or exposure wavelength. In that case, different exposure illuminances and exposure wavelengths in multiple regions can be achieved in a single exposure cycle. Different exposure levels can also be imparted with an identical period of exposure under different exposure illuminances.

[Scanning Exposure]

Scanning exposure can be conducted by applying an image drawing device to form a desired two-dimensional pattern on a drawing surface with light, for example.

One representative example of such a drawing device is an image recording device that is configured to use a laser beam deflection scanning means to scan an object that is being scanned with a laser beam directed from a laser beam generating means to record a prescribed image or the like. This type of image recording device modulates the laser beam being directed from the laser beam generating means based on an image signal during the recording of the image or the like (Japanese Unexamined Patent Publication (KOKAI) Heisei No. 7-52453, the disclosure of which is expressly incorporated by reference herein in its entirety).

A device in which recording is conducted by scanning a laser beam in a secondary scan direction on an object being scanned that has been adhered on the outer circumference surface of a drum rotating in a primary scan direction, and a device in which recording is conducted by rotationally scanning a laser beam over an object being scanned that has been adhered to the cylindrical inner circumference surface of a drum can be employed (Japanese Patent No. 2,783,481, the disclosure of which is expressly incorporated by reference herein in its entirety).

A drawing device forming a two-dimensional pattern on a drawing surface with a drawing head can also be employed. For example, an exposure device forming a desired two-dimensional pattern on the exposure surface of a photosensitive material or the like with an exposure head, which is employed to fabricate semiconductor substrates and print plates, can be employed. A typical example of such an exposure head is equipped with a pixel array with multiple pixels that generates a group of light points constituting a desired two-dimensional pattern. By operating this exposure head while displacing it relative to an exposure surface, a desired two-dimensional pattern can be formed on the exposure surface.

As an exposure device such as those set forth above, for example, an optical device has been proposed that forms a desired image on an exposure surface by displacing a digital micromirror device (DMD) in a prescribed scan direction on an exposure surface, inputting frame data comprised of multiple drawing point data corresponding to the multiple micromirrors into the memory cells of the DMD based on the displacement in the scan direction, and sequentially forming a group of drawing points corresponding to the micromirrors of the DMD in a time series (Japanese Unexamined Patent Publication (KOKAI) No. 2006-327084, the disclosure of which is expressly incorporated by reference herein in its entirety).

In addition to the above DMD, a transmitting-type spatial light-modulating element can be employed as the spatial light-modulating element provided on an exposure head. The spatial light-modulating element can be of either the reflecting type or transmitting type. Additional examples of spatial light-modulating elements include the micro-electrical mechanical system (MEMS) type of spatial light-modulating element (special light modulator (SLM)), optical elements that modulate transmitted light by means of an electro-optical effect (PLZT elements), liquid-crystal light shutters (FLC), and other liquid-crystal shutter arrays. The term "MEMS" is a general term for microsystems integrating microscopic sensors, actuators, and control circuits by means of micromachining technology based on IC manufacturing processes. The term "MEMS-type spatial light-modulating element" means a spatial light-modulating element that is driven by electromechanical operation utilizing electrostatic forces.

A device in which multiple grating light valves (GLVs) are disposed in a two-dimensional configuration can also be employed.

In addition to the above laser beam source, lamps and the like can be employed as the light sources of the exposure head.

[Patterned Light Exposure of Two or More Optically Anisotropic Layers]

A new transfer material for building birefringence patterns can also be transferred onto a laminate obtained by patterned light exposure on a birefringence pattern builder, and then patterned light exposure can be conducted again. In that case, the retardation values remaining following baking in a region that remains unexposed both the first and second times (which normally have the lowest retardation values), a region that is exposed the first time but is not exposed the second time, and a region that is exposed both the first and second times (which normally have the highest retardation values) can be effectively changed. Regions that are not exposed the first time but are exposed the second time can be thought of as being identical after the second exposure to regions that have been exposed both the first and second times. Similarly, by alternately conducting transfer and patterned light exposure three or four times, four or more regions can be readily prepared. This method is useful when it is desirable to impart differences (differences in optical axis direction, extremely large differences in retardation, and the like) to different regions that cannot be imparted by means of exposure conditions alone.

[Heating (Baking)]

A birefringence pattern can be prepared by heating a birefringence pattern builder that has been subjected to the patterned light exposure at 50° C. or higher but not higher than 400° C., preferably at 80° C. or higher but not higher than 400° C.

The birefringence pattern can contain a region in which the retardation is essentially 0. For example, when an optically anisotropic layer is formed employing a liquid-crystal compound having two or more reactive groups, portions that remain unexposed following patterned light exposure lose their retardation during baking, resulting in a retardation of essentially 0.

Also, a new transfer material for building a birefringence pattern can be transferred onto a birefringence pattern builder that has been baked, after which patterned light exposure and baking can be conducted anew. In that case, combining the first and second exposure conditions, the retardation value remaining after the second baking can be effectively changed. This method is useful when it is desirable to form two regions with birefringence properties that mutually differ in the directions of the slow axes in shapes that do not overlap.

[Thermal Writing]

As set forth above, a retardation of essentially 0 can be achieved by baking unexposed regions. Thus, in addition to a latent image based on patterned light exposure, a latent image based on thermal writing can be included in a patterned birefringent product. Thermal writing can be conducted with a thermal head, or by drawing with an IR or YAG laser or the like. For example, information that must be kept secret (personal information, passwords, management codes of products that could compromise designs, and the like) can be conveniently rendered as latent images in combination with a small printer having a thermal head. Thermal writing IR and YAG lasers that are usually used for corrugated fiberboard containers can be used without any modification.

[Functional Layers Laminated on Birefringence Patterns]

After exposing and baking the birefringence pattern builder to form a birefringence pattern as set forth above, functional layers with various functions can be laminated to obtain a patterned birefringent product. The functional layers are not specifically limited. Examples include a surface layer and a printed layer.

[Surface Layers]

Examples of surface layers include a scattering layer that controls the reflection gloss, a hardcoat layer that prevents scratching of the surface, a water-repellent and oil-repellent layer that prevents the sticking of fingerprints and doodling with magic markers, and an antistatic layer that prevents the adhesion of debris due to charge buildup. The scattering layer is preferably a surface irregularity layer formed by embossing or a matte layer that contains matting agents such as particles. The hardcoat layer is preferably a layer containing at least one bifunctional or higher polymerizable monomer, that have been polymerized by irradiation with light or by heating. The surface layer can also be provided on the birefringence pattern builder before pattern formation. The surface layer can be provided in advance on the birefringence pattern builder as an additive layer, for example.

[Protective Layers]

The patterned birefringent product of the present invention preferably has a protective layer. Nonuniformity due to optical interference sometimes appears when a semi-transmissive-half-reflective layer is employed. The nonuniformity due to optical interference can be prevented by suitably selecting the protective layer. The protective layer can be provided such that a semi-transmissive-half-reflective layer (support), a patterned optically anisotropic layer, and a protective layer are present in this order. The protective layer can be provided on the surface on the side to be viewed from. The refractive index of the protective layer can be 1.4 to 1.7, preferably 1.45 to 1.65. The thickness of the protective layer can be 30 micrometers or more, preferably 40 to 200 micrometers, more preferably 50 to 150 micrometers. The specific examples of the protective layer include transparent polymer material, a polymer of a multifunctional monomer, wax, oil, transparent inorganic material. Of these, a transparent polymer material is preferable because it is suitable for formation of a thick layer.

It is preferred that the protective layer is bonded to the product in a state of optical contact, because the nonuniformity can be reduced. A refractive index-matching oil, adhesive, or contact adhesive can be employed to achieve optical contact. The protective layer can be bonded to the other layer (a patterned optically anisotropic layer, orientation layer, or additive layer, for example) by employing an adhesive or contact adhesive. The adhesive or contact adhesive is not particularly limited as long as its refractive index is 1.4 to 1.7, preferably 1.45 to 1.65. Preferable examples include butyl rubber type-, acrylic type-, epoxy type-, isocyanate type-, or silicone type-adhesive or contact adhesive.

[Printed Layers]

Examples of print layers include layers in which patterns that are recognizable with visible light, UV radiation, IR radiation, or the like have been formed. UV fluorescent ink and IR ink are themselves forms of security printing, and are thus preferable to enhance security. The method used to form a printed layer is not specifically limited. Generally known flexo printing, gravure printing, offset printing, screen printing, ink-jet printing, xerography, and the like can be employed. Microprinting at a resolution of 1,200 dpi or higher is preferable to increase security.

[Applications of Patterned Birefringent Products]

Products that are obtained by exposing and baking birefringence pattern builders as set forth above normally either are nearly colorless and transparent, or permit only the identification of an image based on a print layer or the like. However, when such products are sandwiched between two polarizing plates, or, are viewed through a polarizing plate, an additional characteristic contrast or colors are exhibited and can be readily visibly recognized. Utilizing this property, patterned birefringent products obtained by the above manufacturing method can be employed as means of preventing forgery, for example. That is, using a polarizing plate, images with multiple colors that are normally nearly invisible to the naked eye can be made out in the patterned birefringent product. When a birefringence pattern is copied without the intervention of a polarizing plate, nothing is picked up. Conversely, when copied through a polarizing plate, a permanent pattern, that is, a pattern that is visible even without the polarizing plate, remains. Accordingly, it is difficult to duplicate a birefringence pattern. Such methods of producing birefringence patterns are not widespread and the materials are also quite unique. Thus, such products are thought to be suited to use as means of preventing counterfeiting.

A patterned birefringent product of the present invention that contains a semi-transmissive-half-reflective layer can be bonded with an adhesive or the like onto text, photographs, and the like printed on paper. Further, a patterned birefringent product employing a semi-transmissive-half-reflective layer can be bonded onto a common product having an adhesive function, such as a laminate film and a transparent label.

Patterned birefringent products do not only have security functions based on latent images. When coded with bar codes, QR codes, or the like, they can carry digital information. Digital encryption is also possible. As set forth above, by forming high-resolution latent images, a micro latent image that cannot be made out with the naked eye even through a polarizing plate can be printed, thereby further enhancing security. Additionally, security can be enhanced by combining such a product with the printing of invisible ink, such as UV fluorescent ink or IR ink. Such a product can also be combined with the function of label to prevent the breaking of a seal, such that when the label is removed, a portion of the adhesive remains on the target item in the form of a pattern.

Patterned birefringent products can be compounded with functions other than security functions. They can be combined with product information display label functions such as price tags and 'Best used by' dates, water immersion label functions achieved by the printing of ink that changes color when exposed to water, security insurance certificates, and voting forms.

When an adhesive layer is provided on a patterned birefringent product for use as a label, there is a risk of the label being removed from the target item and re-used, thereby compromising security. Thus, the label is preferably processed to render it brittle and prevent its re-use. The method of embrittlement processing is not specifically limited. Examples include methods of embrittling the support itself and cutting notches into the label.

[Optical Elements]

Patterned birefringent products obtained by the above manufacturing method can also be used on optical elements. For example, when a patterned birefringent product obtained by the above manufacturing method is employed as a structural optical element, a special optical element that produces its effect only under prescribed polarization can be fabricated. As an example, a diffraction grating with a birefringence pattern can function as a polarization separating element that strongly diffracts specified polarized light, permitting application to projectors and the field of optical communications.

EXAMPLES

The present invention is described in greater detail below through examples. The materials, reagents, material quantities, and their ratios, operations, and the like indicated in the examples below can be suitably modified without departing from the scope or spirit of the present invention. Accordingly, the scope of the present invention is not limited to the specific examples given below.

(Preparation of Orientation Layer Coating Liquid AL-1)

The following composition was prepared, passed through a polypropylene filter with a pore size of 30 micrometers, and employed as orientation layer coating liquid AL-1.

| Orientation layer coating liquid composition (weight %) | |
|---|---|
| Polyvinyl alcohol (PVA205, manufactured by Kuraray | 3.21 |
| Polyvinyl pyrrolidone (Luvitec K30, manufactured by BASF) | 1.48 |
| Distilled water | 52.10 |
| Methanol | 43.21 |

(Preparation of Optically Anisotropic Layer Coating Liquid LC-1)

The following composition was prepared, passed through a polypropylene filter with a pore size of 0.2 micrometers, and employed as optically anisotropic layer coating liquid LC-1.

LC-1-1 was a liquid-crystal compound with two reactive groups. One of the two reactive groups was a radically reactive group in the form of an acrylic group, and the other was a cationically reactive group in the form of an oxetane group.

| Optically anisotropic layer coating liquid composition (weight %) | |
|---|---|
| Polymerizable liquid crystal compound (LC-1-1) | 32.83 |
| Horizontal orientation agent (LC-1-2) | 0.35 |
| Cation photopolymerization initiator (CPI100-P, manufactured by San-Apro) | 0.66 |
| Polymerization controlling agent (IRGANOX1076, manufactured by Ciba Specialty Chemicals (Ltd.) | 0.07 |
| Methyl ethyl ketone | 48.09 |
| Cyclohexanone | 20.00 |

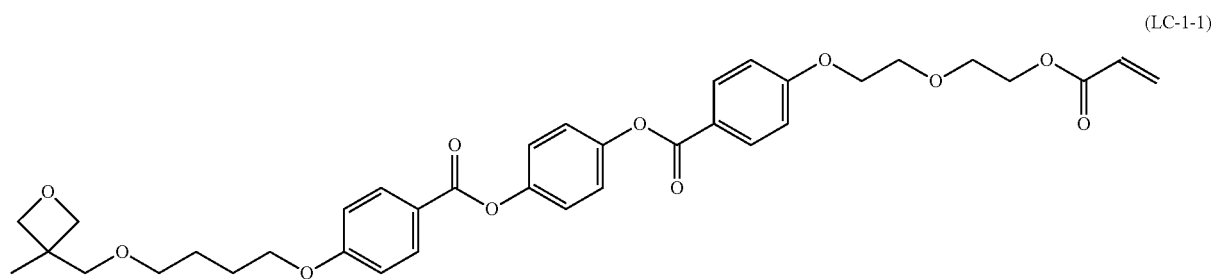

(LC-1-1)

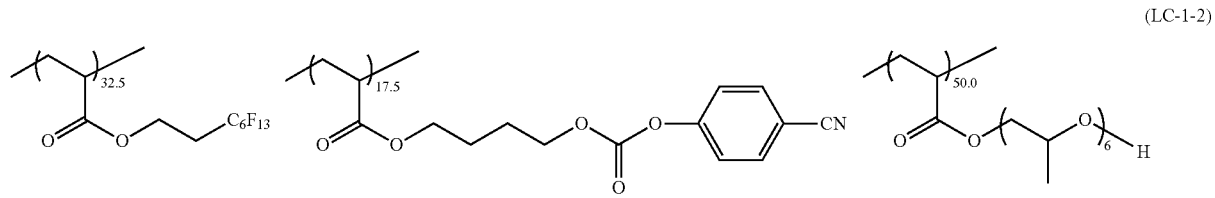

(LC-1-2)

(Preparation of Additive Layer Coating Liquid OC-1)

The composition below was prepared, passed through a polypropylene filter with a 0.2 micrometer pore size, and employed as additive layer coating liquid OC-1. The compound 2-trichloromethyl-5-(p-styrylstyryl)-1,3,4-oxadiazole was employed as radical photopolymerization initiator RPI-1.

| Additive layer coating liquid composition (weight %) | |
|---|---|
| Binder (B-1) | 27.44 |
| Radical photopolymerization initiator (RPI-1) | 0.49 |
| MEGAFAC F-176PF (manufactured by Dainippon Ink and Chemicals Inc.) | 4.65 |
| Methyl ethyl ketone | 67.42 |

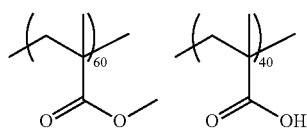

(B-1)

Example 1

Preparation of Birefringence Pattern Builder P-1

Aluminum was vapor-deposited onto a polyethylene naphthalate film of 50 micrometers in thickness (Teonex Q83, manufactured by Teijin DuPont (Ltd.)) to fabricate a support with a semi-transmissive-half-reflective layer of transmittance of 35% and reflectance of 54%. A wire bar was used to apply orientation layer coating liquid AL-1 on the surface on which the aluminum had been vapor deposited and the coating liquid was dried. The dry film thickness was 0.5 micrometer. After a rubbing treatment of the orientation layer, a wire bar was used to apply optically anisotropic layer coating liquid LC-1. Drying was conducted for 2 minutes at a film surface temperature of 80° C. to achieve a liquid-crystal phase state. The applied layer was then illuminated in the air atmosphere by ultraviolet radiation by using a 160 W/cm, air-cooled metal halide lamp (product of Eyegraphics Co., Ltd.), so as to fix the alignment state of the phase to thereby obtain a 1.5-micrometer-thick optically anisotropic layer. The ultraviolet ray employed was 1000 mW/cm² illuminance in the range of UV-A (integrated value in the wavelength between 320 and 400 nm), and 800 mJ/cm² irradiation energy in the range of UV-A. The retardation of the optically anisotropic layer was 150 nm. The optically anisotropic layer was formed of polymer which was solid at 20° C., and presented MEK (methyl ethyl ketone)-resistance. Finally, additive layer coating liquid OC-1 was applied on the optically anisotropic layer and dried to form a 0.8 micrometer additive layer, thereby fabricating birefringence pattern builder P-1 of Example 1.

Example 2

Patterned Birefringent Product

Figure 17:
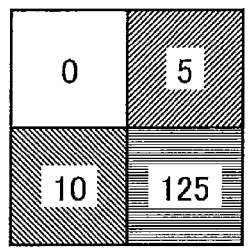
FIG. 17: Diagrams showing the pattern of the patterned light exposure conducted in Example 2 and the exposure level of each region.
Figure 18:
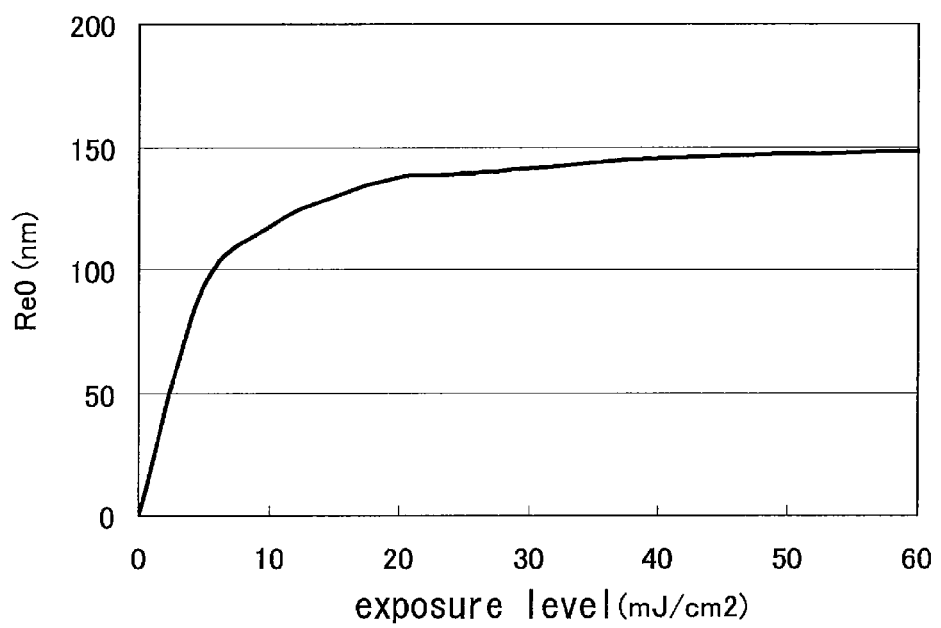
FIG. 18: Diagrams showing the relation between the retardation and the exposure level at the patterned exposure.

Birefringence pattern builder P-1 was subjected to a patterned light exposure with exposure levels of 0 mJ/cm², 5 mJ/cm², 10 mJ/cm², 125 mJ/cm² as shown in FIG. 17 by using a digital exposure device of laser scanning exposure (INPREX IP-3600H manufactured by FujiFilm Co., Ltd.). Subsequently, baking was conducted in a clean oven at 230° C. for one hour to produce a patterned birefringent product P-2. A graph showing the relation between the retardation finally obtained after the baking and the exposure level at the patterned light exposure in the product prepared by using birefringence pattern builder P-1 is shown in FIG. 18.

When the product P-2 was put on a business card to make the polyethylene naphthalate surface come into contact with the card, the printed surface of the business card was recognized visually even through the product P-2. Further, when a polarizing plate (HLC-5618 manufactured by Sanritz Corporation) was superimposed on the product P-2, the birefringence pattern provided on the product P-2 was recognized visually at the prescribed direction of the polarizing plate. The printed surface of the business card was also recognized visually at the same time. However, nonuniformity due to optical interference was observed.

Example 3

Patterned Birefringent Product Having a Protective Layer

Figure 19:
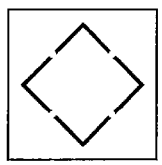
FIG. 19: Diagrams showing embrittlement by cutting notches in the product produced in the Example.

The product P-2 was cut into a 1-cm-square. The square was subjected to an embrittlement processing with notches as shown in FIG. 19, and subsequently, attached to the hot melt surface of a commercially available laminate film of 100 micrometers (manufactured by IRIS OHYAMA) by thermal compression bonding by using the OC layer side as the contact surface. The refractive index of the hot melt contact adhesive was 1.5. Re0 of the laminate film containing the hot melt contact adhesive layer was 650 nm. In the product thus obtained, the visual recognition of the information under the product and the birefringence pattern though a polarizing plate was possible from the side of the laminate film in a similar manner to Example 2. However, the nonuniformity due to optical interference that was observed in Example 2 was not observed.

Example 4

Patterned Birefringent Product Having a Protective Layer

The product P-2 was cut into a 1-cm-square. The square was subjected to an embrittlement processing with notches, and subsequently attached to the hot melt surface of a laminate film provided with 50-micrometer EVA hot melt contact adhesive on one side of a triacetyl cellulose film of 80 micrometers (TD80 manufactured by FujiFilm Co., Ltd.) by thermal compression bonding by using the OC layer side as the contact surface. The refractive index of the hot melt contact adhesive was 1.5. Re0 of the laminate film containing the hot melt contact adhesive layer was 3 nm. In the product thus obtained, the recognition of the information under the product and the birefringence pattern though a polarizing plate was possible from the side of the laminate film in a similar manner to Example 2. However, the nonuniformity due to optical interference that was observed in Example 2 was not observed.

Example 5

Patterned Birefringent Product

Birefringence pattern transfer material P-3 was prepared in a similar manner to that of the preparation of P-1 except a 100-micrometer separation film made of polyolefin (OPULENT, manufactured by Mitsui Chemicals Inc.) is used as a temporary support instead of the support, and the optical anisotropic layer was made to have a thickness of 4.5 micrometers. The same patterned light exposure and baking as those of Example 2 were conducted by using P-3 to thereby form a birefringence pattern. Aluminum was vapor-deposited onto a polyethylene naphthalate film of 50 micrometers in thickness (Teonex Q83, manufactured by Teijin DuPont (Ltd.)) to fabricate a support with a semi-transmissive-half-reflective layer of transmittance of 35% and reflectance of 54%. Patterned birefringent product P-4 was prepared by transferring the additive layer, patterned optically anisotropic layer, and orientation layer of the above birefringence pattern transfer material P-3 after the pattern formation on the above support via adhesive and by removing the temporary support. When a polarizing plate (HLC-5618 manufactured by Sanritz Corporation) was superimposed on the product P-4, the birefringence pattern of magenta, aqua, deep blue, and white that was provided on the product P-4 was recognized visually at the prescribed direction of the polarizing plate. The printed surface of the business card that was put under the product was also recognized visually at the same time. However, the product presented nonuniformity due to optical interference.

In addition, the pattern was bonded to the laminate film, in the same manner as that of Example 4, except P-4 was used instead of P-2. The visual recognition of the information under the product and the birefringence pattern though a polarizing plate was possible from the side of the laminate film in a similar manner to Example 2. However, the nonuniformity due to optical interference that was observed in P-4 was not observed.

Example 6

Patterned Birefringent Product

Figure 20:
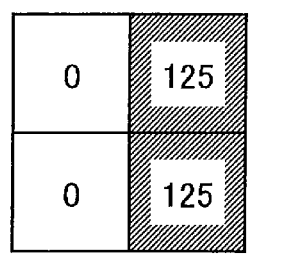
FIG. 20: Diagrams showing the pattern of the patterned light exposure conducted in Example 6 and the exposure level of each region.
Figure 20:
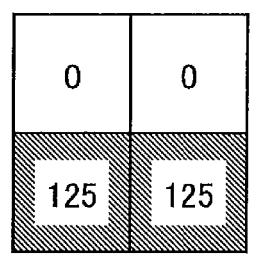

Aluminum was vapor-deposited onto a polyethylene naphthalate film of 100 micrometers in thickness (Tetoron HSL, manufactured by Teijin DuPont (Ltd.)) to fabricate a support with a semi-transmissive-half-reflective layer of transmittance of 50% and reflectance of 30%. On this support, the additive layer, patterned optically anisotropic layer, and orientation layer of birefringence pattern transfer material P-3 were transferred (first) via adhesive, and the temporary support was removed. The patterned light exposure as shown in FIG. 20(a) and baking were conducted in a similar manner to that of Example 2.

On the laminate thus obtained, the additive layer, patterned optically anisotropic layer, and orientation layer of birefringence pattern transfer material P-3 were transferred (second) via adhesive with the slow axis of the optically anisotropic layer inclined 45° to that of the optically anisotropic layer of the first transfer, and the temporary support was removed. The patterned light exposure as shown in FIG. 20(b) and baking were further conducted in a similar manner to that of Example 2 to form birefringence pattern, thereby obtaining a patterned birefringent product.

When a polarizing plate (HLC-5618 manufactured by Sanritz Corporation) was superimposed on the product, the birefringence pattern provided on the product was recognized visually at the prescribed direction of the polarizing plate. The printed surface of the business card that was put under the product was also recognized visually at the same time. However, nonuniformity due to optical interference was observed.

Example 7

Preparation of Birefringence Pattern Builder P-5

(Preparation of Orientation Layer Coating Liquid AL-2)

The following composition was prepared, passed through a polypropylene filter with a pore size of 30 micrometers, and employed as orientation layer coating liquid AL-2.

| Orientation layer coating liquid composition (weight %) | |
|---|---|
| Polyvinyl cinnamate | 3.00 |
| N-methyl pyrrolidone | 97.00 |

(Preparation of Optically Anisotropic Layer Coating Liquid LC-2)

The following composition was prepared, passed through a polypropylene filter with a pore size of 0.2 micrometers, and employed as optically anisotropic layer coating liquid LC-2.

| Optically anisotropic layer coating liquid composition (weight %) | |
|---|---|
| Polymerizable liquid crystal compound (LC-2-1) | 31.16 |
| Horizontal orientation agent (LC-1-2) | 0.35 |
| Radical photopolymerization initiator (RPI-1) | 0.40 |
| Methyl ethyl ketone | 48.09 |
| Cyclohexanone | 20.00 |

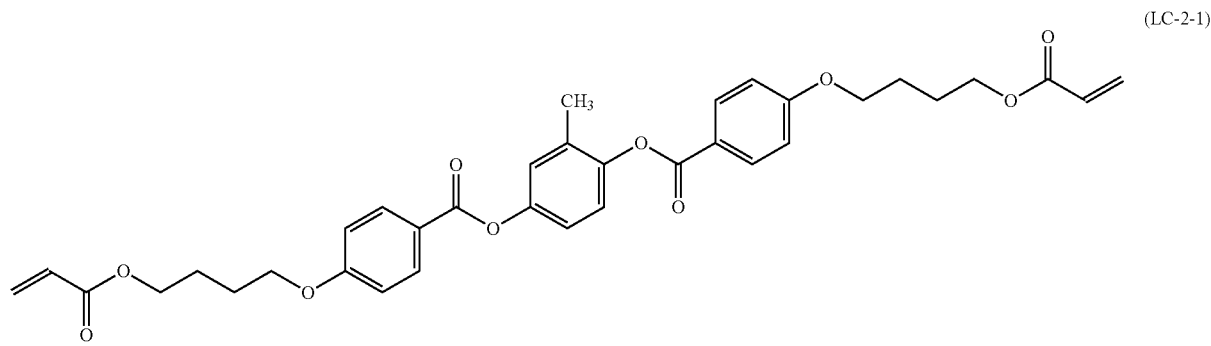 [SMILES: C=CC(=O)OCCCCOc1ccc(C(=O)Oc2ccc(OC(=O)c3ccc(OCCCCOC(=O)C=C)cc3)c(C)c2)cc1]

(LC-2-1)

Figure 21:
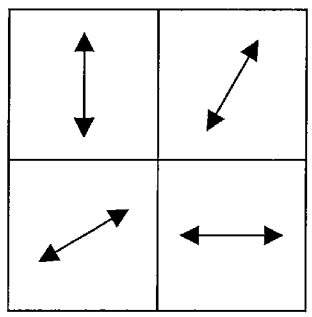
FIG. 21: Diagrams showing the pattern of polarizing axis of polarized ultraviolet radiation on the orientation layer employed in Example 7.

Aluminum was vapor-deposited onto a polyethylene naphthalate film of 50 micrometers in thickness (Teonex Q83, manufactured by Teijin DuPont (Ltd.)) to fabricate a support with a semi-transmissive-half-reflective layer of transmittance of 35% and reflectance of 54%. A wire bar was used to apply orientation layer coating liquid AL-2 on the surface on which the aluminum had been vapor deposited, and the coating liquid was dried. The dry film thickness was 0.5 micrometer. This orientation layer was subjected to a polarized ultraviolet radiation of 800 mJ/cm$^2$ in a pattern having different polarizing axis as shown in FIG. 21, A wire bar was used to apply optically anisotropic layer coating liquid LC-2. Drying was conducted for 2 minutes at a film surface temperature of 100° C. to achieve a liquid-crystal phase state. The applied layer was then illuminated in the air atmosphere by ultraviolet radiation by using a 160 W/cm, air-cooled metal halide lamp (product of Eyegraphics Co., Ltd.), so as to fix the alignment state of the phase to thereby obtain a 1.5-micrometer-thick optically anisotropic layer. Patterned birefringent product of Example 7 was thus obtained. The ultraviolet ray employed was 1000 mW/cm$^2$ illuminance in the range of UV-A (integrated value in the wavelength between 320 and 400 nm), and 800 mJ/cm$^2$ irradiation energy in the range of UV-A. The retardation of the optically anisotropic layer was 170 nm in the direction of slow axis (the direction of the polarized light irradiation). The optically anisotropic layer was formed of polymer which was solid at 20° C., and presented MEK (methyl ethyl ketone)-resistance. When this product was put on a business card to make the polyethylene naphthalate surface come into contact with the card, the printed surface of the business card was recognized visually even through the product. Further, when a polarizing plate (HLC-5618 manufactured by Sanritz Corporation) was superimposed on the product, birefringence patterns that are different in accordance with the directions of the polarizing plate were recognized visually. The printed surface of the business card was also recognized visually at the same time.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any Examples thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

KEY TO THE NUMBERS

101 Patterned optically anisotropic layer
11 (Temporary) support
12 Optically anisotropic layer
13 Semi-transmissive-half-reflective layer
14 Orientation layer
15 Adhesive layer
16 Printed layer
17 Dynamic property control layer
18 Transfer layer
19 Additive layer or surface layer

The invention claimed is:

1. A patterned birefringent product comprising a patterned optically anisotropic layer having two or more regions of different birefringence in the form of a pattern, which further comprises a semi-transmissive-half-reflective layer having a transmittance of 30% or higher and a reflectance of 30% or higher, and a protective layer with a refractive index of 1.4 to 1.7,
wherein the product comprises the semi-transmissive-half-reflective layer, the patterned optically anisotropic layer, and the protective layer in this order,
wherein the regions of different birefringence are regions of different retardation,
wherein the thickness of the protective layer is in the range from 40 to 200 micrometers,
wherein the semi-transmissive-half-reflective layer which has the transmittance of 30% or higher and the reflectance of 30% or higher is disposed only at one side of the patterned optically anisotropic layer, and
wherein the patterned birefringent product permits the visual recognition of the birefringence pattern, through a polarizing plate or another device used for observation of the pattern, from the side of the protective layer.

2. The product according to claim 1, wherein the patterned optically anisotropic layer has a region imparted with a retardation within a range of 30 to 1000 nm and a region imparted with a retardation within a range of less than 30 nm.

3. The product according to claim 2, which is embrittled.

4. The product according to claim 2, wherein the protective layer is a transparent polymer material.

5. The product according to claim 2, comprising an adhesive layer between the patterned optically anisotropic layer and the protective layer, wherein the refractive index of the adhesive layer is in the range from 1.4 to 1.7.

6. The product according to claim 1, wherein the patterned optically anisotropic layer is a layer that is formed of a composition comprising a liquid-crystal compound having at least one reactive group.

7. The product according to claim 6, wherein the patterned optically anisotropic layer is formed by a method comprising steps below:
irradiating with heat or light a layer formed of a composition comprising a liquid-crystal compound;
subjecting the layer to patterned light exposure; and
heating the layer obtained to 50° C. or higher but not higher than 400° C.

8. The product according to claim 7, wherein the patterned light exposure is scanning exposure.

9. The product according to claim 6, wherein the liquid-crystal compound has at least one reactive group for radical polymerization and at least one reactive group for cationic polymerization.

10. The product according to claim 9, wherein the reactive group for radical polymerization is acrylic group or methacrylic group, and the reactive group for cationic polymerization is vinyl ether group, oxetanyl group, or epoxy group.

11. The product according to claim 10, which is embrittled.

12. The product according to claim 10, wherein the two or more regions of different birefringence are in the form of a pattern which becomes visible when viewed through a polarizing plate.

13. The product according to claim 10, wherein the protective layer is a transparent polymer material.

14. The product according to claim 10, comprising an adhesive layer between the patterned optically anisotropic layer and the protective layer, wherein the refractive index of the adhesive layer is in the range from 1.4 to 1.7.

15. The product according to claim 1, which is embrittled.

16. The product according to claim 1, wherein the two or more regions of different birefringence are in the form of a pattern which becomes visible when viewed through a polarizing plate.

17. The product according to claim 1, wherein the protective layer is a transparent polymer material.

18. The product according to claim 1, comprising an adhesive layer between the patterned optically anisotropic layer and the protective layer, wherein the refractive index of the adhesive layer is in the range from 1.4 to 1.7.

* * * * *